(12) United States Patent
Suzuki et al.

(10) Patent No.: US 9,379,876 B2
(45) Date of Patent: *Jun. 28, 2016

(54) MOBILE STATION DEVICE, RADIO COMMUNICATION METHOD AND CIRCUIT DEVICE

(71) Applicant: SHARP KABUSHIKI KAISHA, Osaka-shi, Osaka (JP)

(72) Inventors: Shoichi Suzuki, Osaka (JP); Yasuyuki Kato, Osaka (JP); Shohei Yamada, Osaka (JP); Daiichiro Nakashima, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/201,365

(22) Filed: Mar. 7, 2014

(65) Prior Publication Data

US 2014/0185569 A1    Jul. 3, 2014

Related U.S. Application Data

(63) Continuation of application No. 13/577,842, filed as application No. PCT/JP2011/052629 on Feb. 8, 2011, now Pat. No. 8,705,481.

(30) Foreign Application Priority Data

Feb. 9, 2010  (JP) ................. 2010-026362

(51) Int. Cl.
*H04W 4/00*    (2009.01)
*H04L 5/00*    (2006.01)
(Continued)

(52) U.S. Cl.
CPC ............ *H04L 5/0092* (2013.01); *H04L 1/1854* (2013.01); *H04L 5/0007* (2013.01);
(Continued)

(58) Field of Classification Search
USPC ......... 370/329, 348, 338, 311, 462, 230, 328, 370/445, 341, 346, 447, 461, 522, 229, 330, 370/431, 439, 468; 455/69, 522
See application file for complete search history.

(56) References Cited

U.S. PATENT DOCUMENTS 8,243,657 B2 * 8/2012 Park et al. ..................... 370/328
8,705,481 B2 * 4/2014 Suzuki et al. ................. 370/329
(Continued)

FOREIGN PATENT DOCUMENTS

CN    101641993 A    2/2010
JP    2009-247027 A   10/2009

OTHER PUBLICATIONS

Ericsson, ST-Ericsson "Contention based uplink transmissions", 3GPP TSG-RAN WG2 #66bis, R2-093812, Los Angeles, USA, Jun. 29-Jul. 3, 2009.

(Continued)

*Primary Examiner* — Phuongchau Ba Nguyen
(74) *Attorney, Agent, or Firm* — Birch, Stewart, Kolasch & Birch, LLP

(57) ABSTRACT

A mobile station apparatus, that communicates with a base station apparatus, includes a reception unit that receives a physical downlink shared channel and information indicating radio resources for transmission of a physical uplink shared channel associated with contention based procedure and a transmission unit that transmits Hybrid Automatic Repeat Request (HARQ) information in response to the physical downlink shared channel and the physical uplink shared channel. The transmission unit also transmits, in case that transmissions of the HARQ information and the physical uplink shared channel happen in a single subframe, either both of the HARQ information and the physical uplink shared channel or the physical uplink shared channel without the HARQ information in the single subframe on the basis of a configuration.

7 Claims, 20 Drawing Sheets

(51) Int. Cl.
*H04L 1/18* (2006.01)
*H04W 74/08* (2009.01)
*H04W 52/24* (2009.01)
*H04W 72/04* (2009.01)
*H04W 28/04* (2009.01)
*H04W 72/12* (2009.01)

(52) U.S. Cl.
CPC ............ *H04L5/0037* (2013.01); *H04L 5/0053* (2013.01); *H04L 5/0055* (2013.01); *H04L 5/0058* (2013.01); *H04L 5/0091* (2013.01); *H04W 52/24* (2013.01); *H04W 72/04* (2013.01); *H04W 74/08* (2013.01); *H04W 28/04* (2013.01); *H04W 28/042* (2013.01); *H04W 72/12* (2013.01)

(56) References Cited

U.S. PATENT DOCUMENTS

| | | |
|---|---|---|
| 2009/0191875 A1 | 7/2009 | Vujcic et al. |
| 2009/0241004 A1* | 9/2009 | Ahn ...................... H04L 1/1812 714/749 |
| 2009/0316630 A1 | 12/2009 | Yamada et al. |
| 2010/0098050 A1 | 4/2010 | Yamada et al. |
| 2010/0195604 A1* | 8/2010 | Papasakellariou et al. ... 370/329 |
| 2012/0201219 A1* | 8/2012 | Wager .................. H04L 1/1812 370/329 |
| 2013/0021982 A1 | 1/2013 | Kim et al. |
| 2014/0185569 A1* | 7/2014 | Suzuki et al. ................. 370/329 |

OTHER PUBLICATIONS

Motorola, "Editorial corrections to 36.213", 3GPP TSG-RAN1 Meeting #59, R1-095127, Jeju, Korea, Nov. 9-13, 2009.

U.S. Notice of Allowance issued in U.S. Appl. No. 13/577,842 on Dec. 3, 2012.

* cited by examiner

MOBILE STATION DEVICE, RADIO COMMUNICATION METHOD AND CIRCUIT DEVICE

This application is a Continuation of co-pending application Ser. No. 13/577,842 filed on Sep. 6, 2012, and for which priority is claimed under 35 U.S.C. §120, application Ser. No. 13/577,842 is the national phase of PCT International Application No. PCT/JP2011/052629 filed on Feb. 8, 2011 under 35 U.S.C. §371, which claims the benefit of priority of JP2010-026362 filed Feb. 9, 2010. The entire contents of each of the above-identified applications are hereby incorporated by reference.

TECHNICAL FIELD

The present invention relates to a mobile station device, a radio communication method and a circuit device.

BACKGROUND ART

Evolution of the radio access scheme and the radio network for cellular mobile communication (hereinafter referred to as "Long Term Evolution (LTE)" or "Evolved Universal Terrestrial Radio Access (EUTRA)") has been studied by the 3rd Generation Partnership Project (3GPP). According to LTE, as a communication scheme for radio communication from a base station device to a mobile station device (downlink), the Orthogonal Frequency Division Multiplexing (OFDM) scheme which is a multicarrier transmission scheme is used. As a communication scheme for radio communication from a mobile station device to the base station device (uplink), the SC-FDMA (Single-Carrier Frequency Division Multiple Access) scheme which is a single-carrier transmission scheme is used.

According to LTE, the base station device determines radio resource allocation, code rate, and modulation scheme for example, for a PUSCH (Physical Uplink Shared Channel) which is a channel for transmitting data by a mobile station device and a PDSCH (Physical Downlink Shared Channel) which is a channel for transmitting data by the base station device. The base station device also transmits downlink control information (DCI) indicating information such as the radio resource allocation to the mobile station device using a PDCCH (Physical Downlink Control Channel).

According to LTE, the mobile station device transmits uplink control information (UCI) such as acknowledgement indicating whether PDSCH has been successfully received or not (Acknowledgement or Non-Acknowledgement (which will be hereinafter referred to as "ACK or NACK" or "ACK/NACK") and channel quality information (or also referred to as channel state information) indicating the quality of the downlink channel to the base station device using a PUCCH (Physical Uplink Control Channel). When the mobile station device transmits uplink control information, in the case where the PUSCH radio resource is allocated from the base station device, the mobile station device transmits the uplink control information not using the PUCCH but using the PUSCH.

The 3GPP has also studied a radio access scheme and a radio network that use a wider frequency band than LTE to implement still faster data communication (hereinafter referred to as "Long Term Evolution-Advanced (LTE-A)" or "Advanced Evolved Universal Terrestrial Radio Access (A-EUTRA)"). LTE-A requires backward compatibility with LTE, namely requires that a base station device of LTE-A should communicate by radio with both a mobile station device of LTE-A and a mobile station device of LTE simultaneously, and a mobile station device of LTE-A should be able to communicate by radio with both the base station device of LTE-A and the base station device of LTE. LTE-A has studied use of the same channel structure as that of LTE.

"Contention based uplink transmissions" (NPL 1) proposes to introduce contention based uplink transmission in order to improve the latency and the overhead in LTE-A. In contention based uplink transmission, a base station device transmits downlink control information that includes PUSCH radio resource allocation for example and can be received by a plurality of mobile station devices. A mobile station device detects the downlink control information and transmits the PUSCH based on the downlink control information. In the case of contention based uplink transmission, a plurality of mobile station devices may detect the same downlink control information. As a result, a plurality of mobile station devices use the same radio resource to transmit respective PUSCHs and thus respective PUSCHs from these mobile station devices are in contention (collide) with each other.

The contention based uplink transmission using the PUSCH is different from random access using a physical random access channel (Physical Random Access Channel: PRACH). The contention based uplink transmission and the random access are identical in terms of the possibility of contention (collision). They are different from each other in that a radio resource used for preamble transmission by the random access is the PRACH indicated by system information broadcasted by the base station device, while a radio resource used by the contention based uplink transmission is the PUSCH scheduled by the PDCCH.

For transmission of message 3 in the random access process, the PUSCH is used. After transmitting the preamble via the PRACH, the mobile station device transmits uplink data using a PUSCH radio resource scheduled by a random access response (message 2) while the possibility of collision still remains. In contrast, as for the contention based uplink transmission, preamble transmission via the PRACH is not performed, the base station device uses the PDCCH to schedule the PUSCH radio resource having the possibility of collision, and the mobile station device transmits uplink data using the scheduled PUSCH radio resource. Namely, the contention based uplink transmission does not involve the random access process.

According to LTE, basically access is made using a scheduling request (SR). The mobile station device uses a PUCCH or PRACH to request a PUSCH radio resource for transmitting uplink data. In contrast, regarding the contention based uplink transmission, the mobile station device does not make the scheduling request but can directly transmit uplink data, and therefore, the latency is improved as compared with the access method using the scheduling request. Unlike the PRACH, the PUSCH has no guard time. Therefore, only a mobile station device with valid uplink timing adjustment (Time Alignment) can access the base station device through contention based uplink transmission. The period for which the uplink timing adjustment is valid is a certain period (including infinity) from reception of uplink timing information (Timing Advance Command).

CITATION LIST

Non Patent Literature

NPL 1: "Contention based uplink transmissions", 3GPP TSG RAN WG2 Meeting #66bis, R2-093812, Jun. 29 to Jul. 3, 2009.

SUMMARY OF INVENTION

Technical Problem

However, the base station device cannot recognize by which mobile station device performs contention based uplink transmission and when this contention based uplink transmission is performed. This causes a problem that the contention based uplink transmission signal may collide with another uplink signal transmitted by the dedicated radio resource allocated by the base station device to the mobile station device.

The present invention has been made in view of the problem above, and an object of the invention is to provide a mobile station device, a radio communication method and a circuit device by which transmission of a contention based uplink transmission signal and other uplink signals can efficiently be performed.

Solution to Problem (1) According to an aspect of the present invention, a mobile station device communicates with a base station device. The mobile station device includes a reception unit receiving downlink data and a downlink control channel including information indicating a radio resource for contention based signal transmission; and a transmission unit transmitting at least one of a contention based signal and ACK or NACK for the downlink data when the contention based signal and the ACK or NACK collide with each other in the same uplink time frame.

(2) Preferably, the base station device sets whether each or only one of the contention based signal and the ACK or NACK is allowed to be transmitted in the same uplink time frame.

(3) Preferably, when it is set that the contention based signal and the ACK or the NACK are allowed to be transmitted in the same uplink time frame, and when total power of transmission power of the contention based signal and transmission power of the ACK or NACK exceeds predetermined transmission power, the transmission unit transmits the ACK or NACK on an uplink control channel.

(4) According to another aspect of the present invention, a mobile station device communicates with a base station device. The mobile station device includes a reception unit receiving a downlink control channel including information indicating a radio resource for contention based signal transmission; and a transmission unit transmitting a reference signal for uplink channel quality measurement using the radio resource allocated to the base station device. The transmission unit transmits a contention based signal without transmitting the reference signal when the contention based signal and the reference signal collide with each other in the same time frame.

(5) According to still another aspect of the present invention, a radio communication method is applied to a mobile station device communicating with a base station device. The radio communication method includes the steps of: receiving downlink data and a downlink control channel including information indicating a radio resource for contention based signal transmission; and transmitting at least one of ACK or NACK for the downlink data and a contention based signal when the ACK or NACK and the contention based signal collide with each other in the same uplink time frame.

(6) According to still another aspect of the present invention, a radio communication method is applied to a mobile station device communicating with a base station device. The radio communication method includes the steps of: receiving a downlink control channel including information indicating a radio resource for contention based signal transmission; transmitting a reference signal for uplink channel quality measurement using the radio resource allocated to the base station device; and transmitting a contention based signal without transmitting the reference signal when the contention based signal and the reference signal collide with each other in the same time frame.

(7) According to still another aspect of the present invention, a circuit device is a circuit device in a mobile station device communicating with a base station device. The circuit device includes a reception circuit receiving downlink data and a downlink control channel including information indicating a radio resource for contention based signal transmission; and a transmission circuit transmitting at least one of ACK or NACK for the downlink data and a contention based signal when the ACK or NACK and the contention based signal collide with each other in the same uplink time frame.

(8) Preferably, the circuit device is an integrated circuit into which the reception circuit and the transmission circuit are integrated.

(9) According to still another aspect of the present invention, a circuit device is a circuit device in a mobile station device communicating with a base station device. The circuit device includes a reception circuit receiving a downlink control channel including information indicating a radio resource for contention based signal transmission; and a transmission circuit transmitting a reference signal for uplink channel quality measurement using the radio resource allocated to the base station device. The transmission circuit transmits a contention based signal without transmitting the reference signal when the contention based signal and the reference signal collide with each other in the same time frame.

(10) Preferably, the circuit device is an integrated circuit into which the reception circuit and the transmission circuit are integrated.

Advantageous Effects of Invention

In accordance with the present invention, contention based uplink transmission can efficiently be performed.

DESCRIPTION OF EMBODIMENTS

First Embodiment

The first embodiment of the present invention will hereinafter be described in detail with reference to the drawings.

<As to Radio Communication System>

Figure 1:
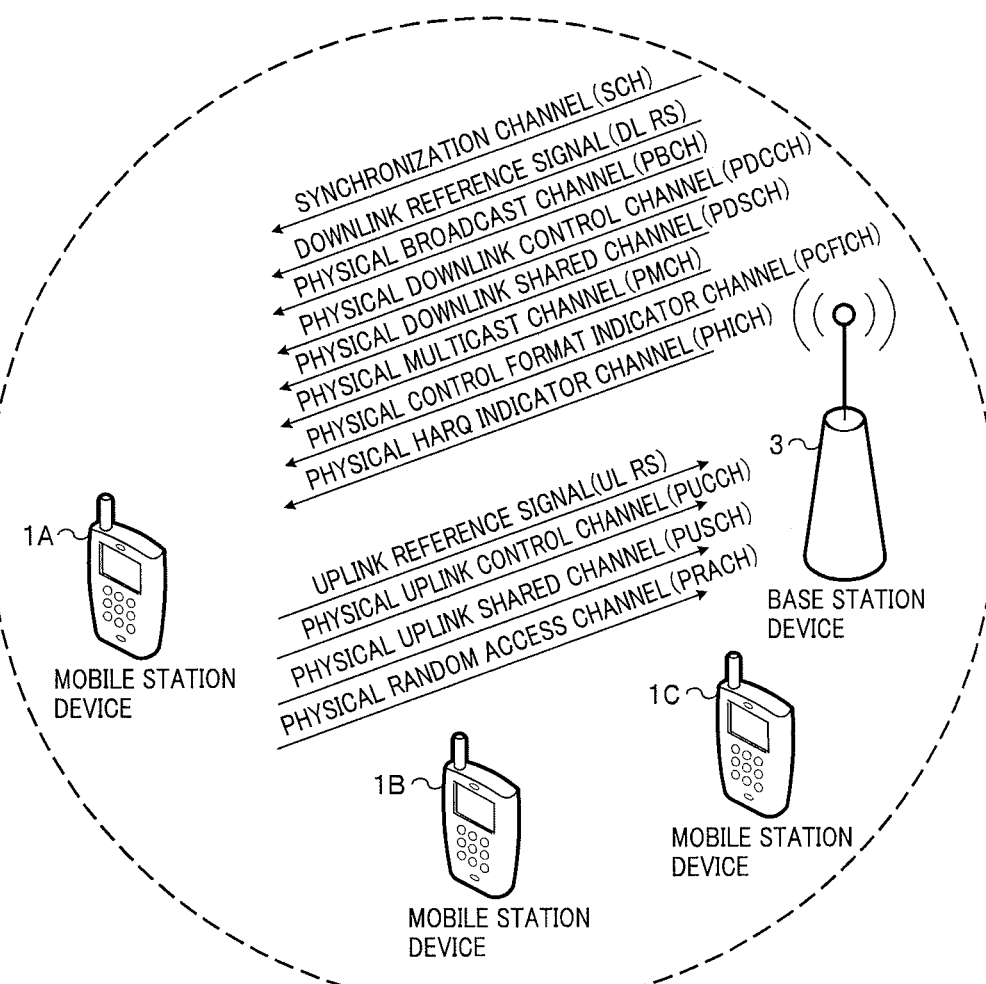
FIG. 1 is a conceptual diagram of a radio communication system according to the first embodiment of the present invention.

FIG. 1 is a conceptual diagram of a radio communication system according to the first embodiment of the present invention. In FIG. 1, the radio communication system includes mobile station devices 1A to 1C and a base station device 3. FIG. 1 illustrates radio communication from base station device 3 to mobile station devices 1A to 1C (downlink) for which a synchronization channel (SCH), a downlink pilot channel (which may alternatively be referred to as "Downlink Reference Signal (DL RS)"), a physical broadcast channel (PBCH), a physical downlink control channel (PDCCH), a physical downlink shared channel (PDSCH), a physical multicast channel (PMCH), a physical control format indicator channel (PCFICH), and a physical Hybrid ARQ indicator channel (PHICH) are allocated.

FIG. 1 also illustrates radio communication from mobile station devices 1A to 1C to base station device 3 (uplink) for which an uplink pilot channel (which may alternatively be referred to as "Uplink Reference Signal: UL RS"), a physical uplink control channel (PUCCH), a physical uplink shared channel (PUSCH), and a physical random access channel (PRACH) are allocated. In the following, mobile station devices 1A to 1C will be referred to as mobile station device 1.

<As to Downlink Radio Frame>

Figure 2:
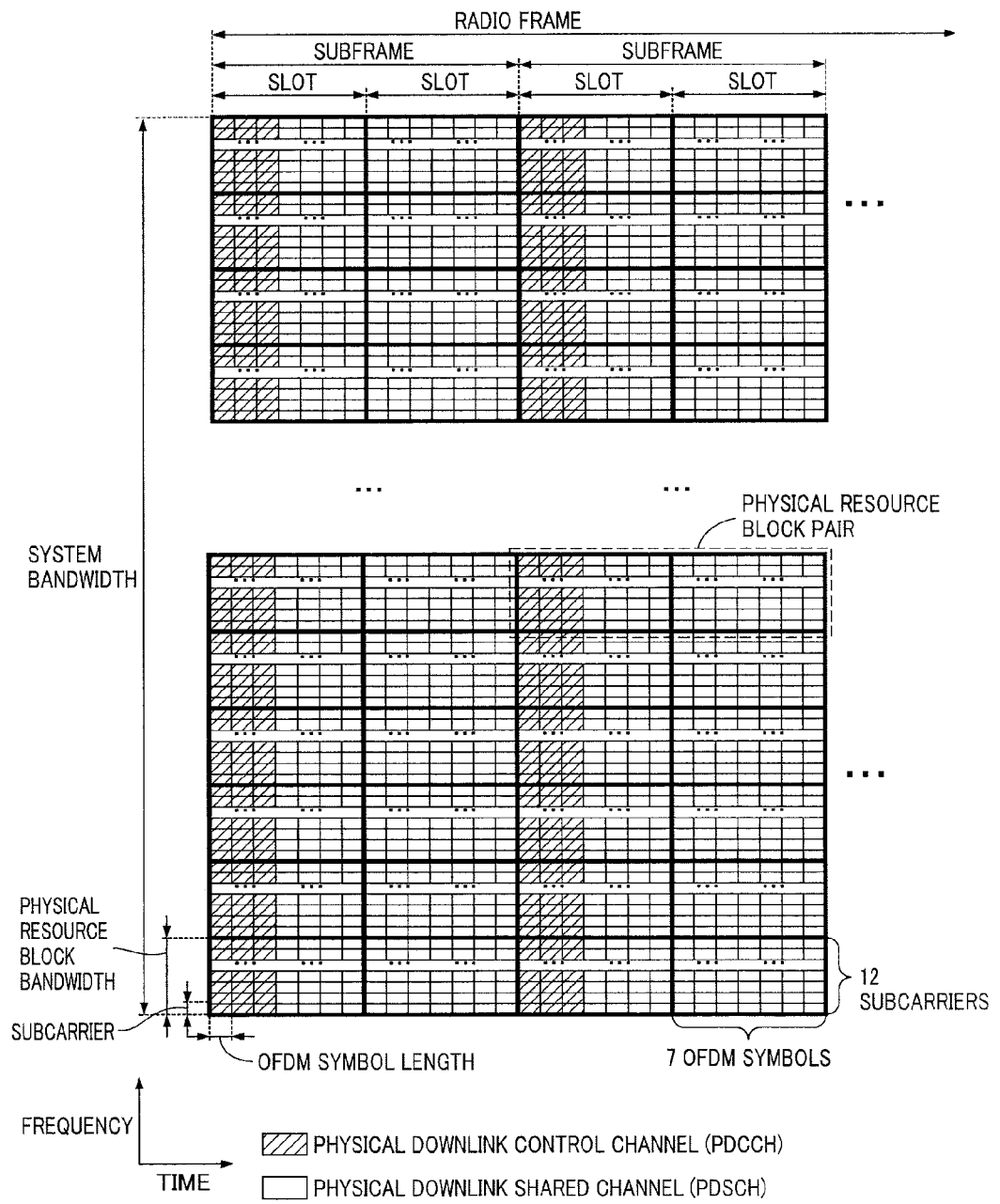
FIG. 2 is a schematic diagram illustrating an example configuration of a downlink radio frame according to the present invention.

FIG. 2 is a schematic diagram illustrating an example configuration of a downlink radio frame according to the present invention. In FIG. 2, the horizontal axis represents the time domain and the vertical axis represents the frequency domain. As shown in FIG. 2, the downlink radio frame is made up of a plurality of downlink physical resource block (PRB) pairs (a physical resource block pair is a region for example enclosed by the broken line in FIG. 2). The downlink physical resource block pair is a unit for radio resource allocation for example and consists of a frequency band of a predetermined width (PRB bandwidth: 180 kHz) and a time length (two slots=one subframe (time frame): 1 ms).

One downlink physical resource block pair consists of two downlink physical resource blocks (PRB bandwidth×slots) that are consecutive in the time domain. One downlink physical resource block (the unit enclosed by the bold line in FIG. 2) consists of 12 subcarriers (15 kHz) in the frequency domain and seven OFDM symbols (71 μs) in the time domain. In the time domain, a slot (0.5 ms) consists of seven OFDM (Orthogonal Frequency Division Multiplexing) symbols, a subframe (1 ms) consists of two slots, and a radio frame (10 ms) consists of 10 subframes. In the frequency domain, a plurality of downlink physical resource blocks are mapped depending on the downlink bandwidth. Here, a unit consisting of a single subcarrier and a single OFDM symbol will be referred to as "downlink resource element."

In the following, channels allocated in the downlink radio frame will be described. In each downlink subframe, PDCCH, PDSCH, and downlink reference signal for example are allocated. A description will be given first of the PDCCH. The PDCCH is mapped to a region starting from the first OFDM symbol in the subframe (the region hatched with left oblique lines in FIG. 2). The number of the OFDM symbols to which the PDCCH is mapped is one to three and is different from subframe to subframe. To the PDCCH, a signal of downlink control information (DCI) is mapped which is information including an information format such as downlink assignment (referred to also as downlink grant) and uplink grant and used for controlling communication.

The downlink assignment includes information such as information indicating a modulation scheme for the PDSCH, information indicating a coding scheme, information indicating radio resource allocation, information about HARQ (Hybrid Automatic Repeat Request), and TPC command, for example. The uplink grant includes information such as information indicating a modulation scheme for the PUSCH, information indicating a coding scheme, information indicating radio resource allocation, information about HARQ, and TPC command, for example. HARQ refers to a technology as follows. Specifically, in the case for example where mobile station device 1 (base station device 3) transmits to base station device 3 (mobile station device 1) whether or not data information has been decoded successfully (Acknowledgement/Negative Acknowledgement: ACK/NACK) and mobile station device 1 (base station device 3) cannot decode the data information due to an error (NACK), base station device 3 (mobile station device 1) retransmits the signal and mobile station device 1 (base station device 3) decodes a synthesized signal of the re-received signal and the signal having already been received.

A description will be given next of the PDSCH. The PDSCH is mapped to OFDM symbols (the non-hatched region in FIG. 2) other than the OFDM symbols to which the PDCCH is mapped in the subframe. To the PDSCH, a signal of data information (transport block) is mapped. PDSCH radio resources are allocated by the downlink assignment and mapped to the same downlink subframe as the PDCCH including this downlink assignment. While the downlink reference signal is not shown in FIG. 2 for the sake of simplicity of description, the downlink reference signal is mapped so that it is distributed in the frequency domain and the time domain.

<As to PDCCH>

In the following, the PDCCH will be described in more detail. The PDCCH is mapped to one or a plurality of control channel elements (CCE). The control channel element is made up of a plurality of downlink resource elements distributed in the frequency domain and the time domain within the region where the PDCCH is mapped (the region hatched with the left oblique lines in FIG. 2). A plurality of control channel elements form a common search space and a mobile station device (user equipment)-specific search space each.

The common search space is a space which is shared by a plurality of mobile station devices 1 and to which the PDCCH for a plurality of mobile station devices 1 and/or the PDCCH for a specific mobile station device 1 is mapped. The common search space consists of predetermined control channel elements. The mobile-station-device-specific search space is a space to which the PDCCH for a specific mobile station device 1 is mapped and which is formed for each mobile station device 1. Different common search spaces and mobile-station-device-specific search spaces are formed depending on the number of control channel elements where the PDCCH is mapped (control channel elements forming a candidate to which the PDCCH is mapped (hereinafter referred to as "PDCCH candidate")). For example, for a PDCCH candidate consisting of four control channel elements and a PDCCH candidate consisting of eight control channel elements, two common search spaces are provided. For a PDCCH candidate consisting of one control channel element, a PDCCH candidate consisting of two control channel elements, a PDCCH candidate consisting of four control channel elements, and a PDCCH candidate consisting of eight control channel elements, four mobile-station-device-specific search spaces are provided. The common search spaces and the mobile-station-device-specific search spaces may partially or wholly overlap each other, different common search spaces may partially or wholly overlap each other, different mobile-station-device-specific search spaces for the same mobile station device 1 may partially or wholly overlap each other, or mobile-station-device-specific search spaces for different mobile station devices 1 may partially or wholly overlap each other.

For the downlink control information such as downlink assignment and uplink grant, a plurality of formats are prepared. The format for the downlink control information is called DCI format. For example, as the DCI formats for uplink grant, DCI format 0 used in the case where mobile station device 1 transmits the PUSCH using one transmission antenna port, and DCI format 0A used in the case where mobile station device 1 transmits the PUSCH using MIMO (Multiple Input Multiple Output) SM (Spatial Multiplexing) are prepared. As the DCI formats for downlink grant, DCI format 1 and DCI format 1A used in the case where base station device 3 transmits the PDSCH using one transmission antenna port or a plurality of transmission antenna ports by means of the transmission diversity scheme, and DCI format 2 used in the case where the base station device transmits the PDSCH by means of the MIMO SM are prepared. There are DCI formats with the same number of bits and DCI formats with different numbers of bits.

Base station device 3 attaches, to the downlink control information, a sequence that is generated by scrambling, with an RNTI (Radio Network Temporary Identifier), a cyclic redundancy check (CRC) code generated based on the downlink control information. Mobile station device 1 changes interpretation of the downlink control information depending on which RNTI is used to scramble the cyclic redundancy check code. For example, mobile station device 1 determines that, in the case where the cyclic redundancy check code is scrambled with a C-RNTI (Cell-Radio Network Temporary Identifier) allocated by base station device 3 to the mobile station device, the downlink control information indicates a radio resource for the mobile station device. In the case where the cyclic redundancy check code is scrambled with a CB-RNTI (Contention Based-Radio Network Temporary Identifier) allocated by base station device 3 to the mobile station device or broadcasted by base station device 3, mobile station device 1 determines that the downlink control information indicates a radio resource for contention based uplink transmission. In the following, the fact that the cyclic redundancy check code scrambled with the RNTI is attached to the downlink control information will be described simply as that the downlink control information includes the RNTI or the PDCCH includes the RNTI.

Base station device 3 codes the downlink control information in accordance with the number of bits of control channel elements, and maps it to the common search space or mobile-station-device-specific search space. Base station device 3 codes in the same manner the DCI formats with the same number of bits, and codes in different manners the DCI formats with respective numbers of bits different from each other. Namely, depending on the number of bits of the DCI format, the coding scheme applied by base station device 3 to the DCI format varies, and therefore, depending on the number of bits of the DCI format, the way to decode the DCI format by mobile station device 1 varies as well. Thus, mobile station device 1 can identify the type of the DCI format based on the difference in the number of bits of the DCI format or the difference in the way to decode it. In the case where DCI formats have the same number of bits, the DCI formats may include information for identifying the type of the DCI formats, or the method that attaches the cyclic redundancy check code scrambled with the RNTI appropriate for the type of the DCI format may be used, so as to enable mobile station device 1 to identify the type of the DCI format.

Mobile station device 1 decodes all candidates where the PDCCH is mapped in the common search space and the mobile-station-device-specific search space, descrambles the sequence generated by scrambling the cyclic redundancy check code with the RNTI, further with the RNTI and, when no error is detected in the descrambled cyclic redundancy check code, it determines that the PDCCH has successfully been obtained. This process is called blind decoding.

In the case where the downlink control information indicates a radio resource for contention based uplink transmission, base station device 3 includes the CB-RNTI in DCI format 0 and/or DCI format 0A, or base station device 3 includes the CB-RNTI in DCI format 0B having the same number of bits as DCI format 0 or DCI format 0A. Mobile station device 1 determines from the RNTI included in the downlink control information whether the downlink control information indicates a radio resource for a specific mobile station device 1 or a radio resource for contention based uplink transmission, to thereby eliminate the need of mobile station device 1 of performing blind decoding in different manners for the downlink control information indicating a radio resource for a specific mobile station device 1 and the downlink control information indicating a radio resource for contention based uplink transmission. In this way, the load of the blind decoding on mobile station device 1 can be reduced.

Base station device 3 maps the PDCCH including the C-RNTI to the common search space or the mobile-station-device-specific search space for mobile station device 1 to which the C-RNTI is allocated, and mobile station device 1 performs blind decoding of the PDCCH including the C-RNTI in the common search space and the mobile-station-device-specific search space. Base station device 3 maps the PDCCH including a P-RNTI (Paging-Radio Network Temporary Identifier) used for scheduling paging information and update information for the system information, the PDCCH including an SI-RNTI (System Information-Radio Network Temporary Identifier) used for scheduling the system information, and the PDCCH including an RA-RNTI (Random Access-Radio Network Temporary Identifier) used for scheduling random access response to the common search space, and mobile station device 1 performs blind decoding of the PDCCH including the P-RNTI, the PDCCH including the SI-RNTI, and the PDCCH including the RA-RNTI in the common search space.

Base station device 3 maps the PDCCH including the CB-RNTI to the common search space and mobile station device 1 performs blind decoding of the PDCCH including the CB-RNTI in the common search space. Thus, the PDCCH including the CB-RNTI is mapped to the common search space so that equal opportunities can be given of detecting the PDCCH including the CB-RNTI by a plurality of mobile station devices 1 communicating by radio with base station device 3.

Base station device 3 may map the PDCCH including the CB-RNTI to the common search space or mobile-station-device-specific search space, and mobile station device 1 may perform blind decoding of the PDCCH including the CB-RNTI in the common search space and the mobile-station-device-specific search space. In the case where base station device 3 maps the PDCCH including the CB-RNTI to the mobile-station-device-specific search space, it may map the PDCCH to a region where mobile-station-device-specific search spaces for a plurality of mobile station devices 1 overlap each other. Accordingly, even when the PDCCH including the CB-RNTI is mapped to the mobile-station-device-specific search space, a plurality of mobile station devices 1 can detect the PDCCH including the CB-RNTI. Thus, the PDCCH including the CB-RNTI is mapped to the common search space or mobile-station-device-specific search space to increase the degree of freedom in mapping the PDCCH including the CB-RNTI.

Mobile station device 1 to which an uplink radio resource is allocated appropriately by base station device 3 may transmit the PUSCH to base station device 3 using the radio resource allocated thereto, without performing contention based uplink transmission. Thus, a higher layer of mobile station device 1 of the present invention instructs its physical layer (reception unit) to perform blind decoding of the PDCCH including the CB-RNTI in the case where an uplink radio resource is not allocated in spite of the fact that there is data information to be uplink transmitted. The physical layer of mobile station device 1 performs blind decoding of the PDCCH including the CB-RNTI only in the case where the physical layer of mobile station device 1 is instructed by the higher layer thereof to do so. Thus, mobile station device 1 performs blind decoding of the PDCCH including the CB-RNTI only when required. Therefore, blind decoding of the PDCCH including the CB-RNTI can efficiently be performed. In order to lower the probability of collision between contention based uplink transmissions, a subframe on which blind decoding of the PDCCH including the CB-RNTI is performed for each mobile station device 1 may for example be limited to the even-number or odd-number subframe.

<As to Uplink Radio Frame>

Figure 3:
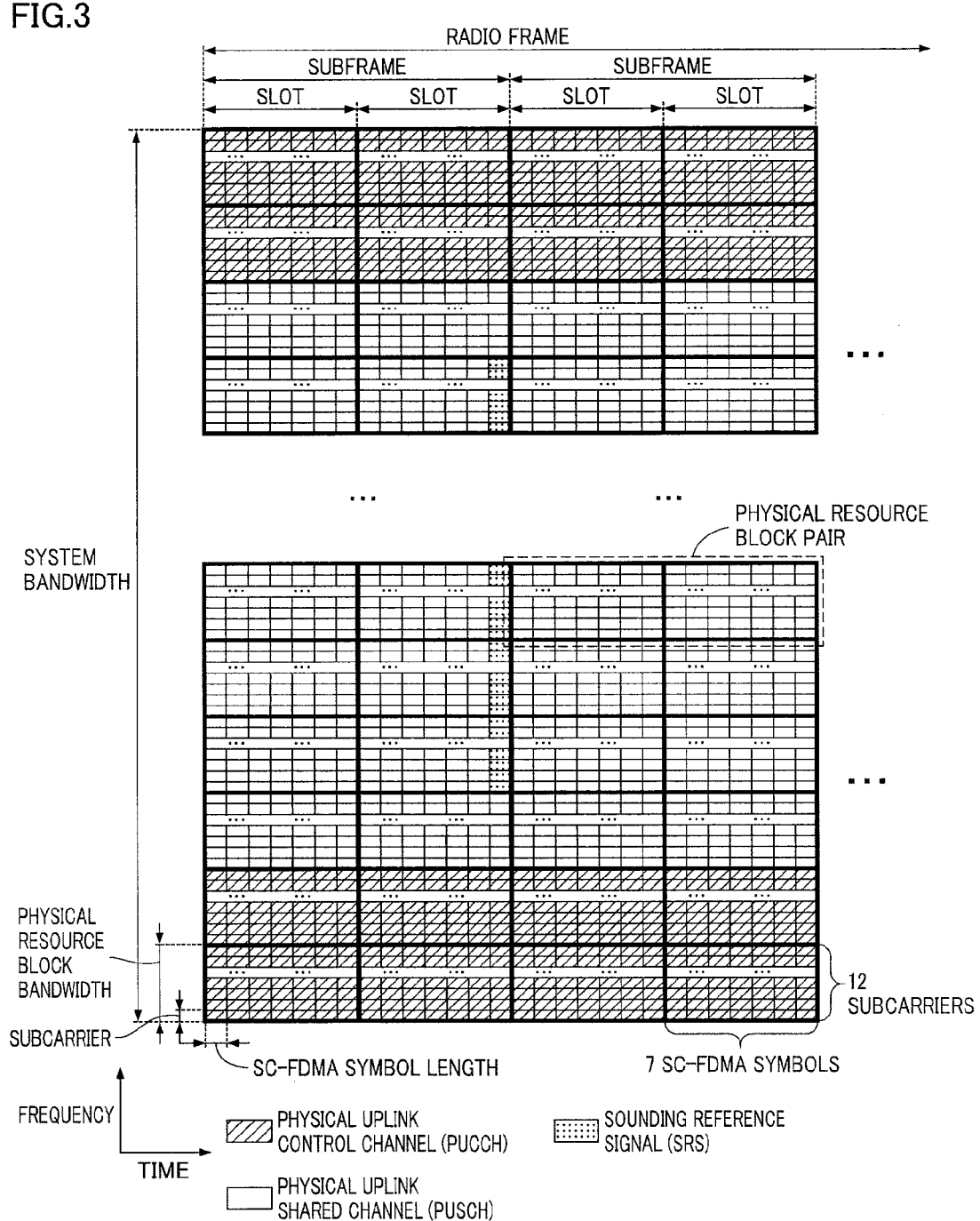
FIG. 3 is a schematic diagram illustrating an example configuration of an uplink radio frame according to the present invention.

FIG. 3 is a schematic diagram illustrating an example configuration of an uplink radio frame according to the present invention. In FIG. 3, the horizontal axis represents the time domain and the vertical axis represents the frequency domain. As shown in FIG. 3, the uplink radio frame is made up of a plurality of uplink physical resource block pairs (for example, a physical resource block pair is the region enclosed by the broken line in FIG. 3). The uplink physical resource block pair is a unit for radio resource allocation for example and consists of a frequency band of a predetermined width (PRB bandwidth: 180 kHz) and a time length (two slots=one subframe: 1 ms).

One uplink physical resource block pair consists of two uplink physical resource blocks (PRB bandwidth×slots) that are consecutive in the time domain. One uplink physical resource block (the units each enclosed by the bold line in FIG. 3) consists of 12 subcarriers (15 kHz) in the frequency domain and seven SC-FDMA (Single-Carrier Frequency Division Multiple Access) symbols (71 µs) in the time domain. In the time domain, a slot (0.5 ms) consists of seven SC-FDMA symbols, a subframe (1 ms) consists of two slots, and a radio frame (10 ms) consists of 10 subframes. In the frequency domain, a plurality of uplink physical resource blocks are mapped depending on the uplink bandwidth. Here, a unit consisting of a single subcarrier and a single SC-FDMA symbol will be referred to as "uplink resource element".

In the following, channels allocated in the uplink radio frame will be described. In each uplink subframe, PUCCH, PUSCH, and uplink reference signal for example are allocated. A description will be given first of the PUCCH. The PUCCH is allocated to uplink physical resource blocks located on the opposite ends of the uplink bandwidth (the region hatched with left oblique lines in FIG. 3). To the PUCCH, a signal of uplink control information (UCI) is mapped which is information used for controlling communication, such as channel quality information (or also referred to as channel state information) indicating downlink channel quality, scheduling request (SR) indicating a request for uplink radio resource allocation, and ACK/NACK which is a response concerning receipt of the PDSCH.

The channel quality information is represented using a CQI (Channel Quality Indicator), a PMI (Precoding Matrix Indicator) and a RI (Rank Indicator). The CQI is information indicating the channel quality for changing radio transmission parameters such as a channel error correcting scheme, a error correction code rate and a data modulation multivalued number for the PDSCH. The RI is information requested by mobile station device 1 when performing spatial multiplexing transmission in a MIMO-SM scheme in the downlink. This information indicates the number (Rank) of units (stream) of the transmission signal sequence on the PDSCH by which the transmission signal sequence is pre-processed in advance. The PMI is information requested by mobile station device 1 when performing spatial multiplex transmission in the MIMO-SM scheme. This information indicates precoding by which the transmission signal sequence on the PDSCH is pre-processed in advance.

The PUCCH radio resource consists of a pair of one physical resource block in the first slot and one physical resource block in the second slot within the subframe. The physical resource block in the first slot and the physical resource block in the second slot establish a symmetrical positional relation in the frequency domain. Furthermore, a plurality of PUCCH radio resources are code-multiplexed to this one physical resource block pair.

Each radio resource to which the PUCCH used for transmitting a scheduling request is mapped is a periodical radio resource set by base station device 3 for each mobile station device 1. Each radio resource to which the PUCCH used for transmitting channel quality information is mapped is a periodical radio resource set by base station device 3 for each mobile station device 1. The radio resource to which the PUCCH used for transmitting ACK/NACK is mapped is mapped to an uplink subframe appearing a predetermined time after a downlink subframe by which the PDSCH is received (for example, an uplink subframe corresponding to a downlink subframe appearing four subframes after the downlink subframe by which the PDSCH is received). Base station device 3 may set in advance as to which PUCCH radio resource within the subframe the mapping is made, or the mapping may be made to the PUCCH radio resource corresponding to the downlink radio resource to which the downlink assignment indicating PDSCH radio resource allocation is mapped.

A description will be given next of the PUSCH. The PUSCH is allocated to uplink physical resource block pairs (the non-hatched region in FIG. 3) other than the uplink physical resource blocks where the PUCCH is mapped. To the PUSCH, a signal of uplink control information and/or data information (transport block) which is information other than the uplink control information is mapped. The PUSCH radio resource is allocated by means of uplink grant, and mapped to an uplink subframe appearing a predetermined time after a downlink subframe by which the PDCCH including the uplink grant is received by mobile station device 1 (for example, an uplink subframe corresponding to the downlink subframe appearing four subframes after the downlink subframe by which the PDCCH is received).

Then, an uplink reference signal will be hereinafter described. The uplink reference signal includes a demodulation reference signal (DMRS) that is transmitted together with a PUSCH and a PUCCH and used for demodulation with the PUSCH and the PUCCH, and a sounding reference signal (SRS) transmitted independently of the PUSCH and the PUCCH and used by base station device 3 for estimating an uplink channel and determining radio resource allocation, code rate and modulation scheme for the PUSCH. The DMRS is mapped to a predetermined SC-FDMA symbol in the physical resource block to which the PUSCH and the PUCCH are transmitted. For the PUSCH and the PUCCH, SC-FDMA symbols to which DMRS is mapped are different. For the purpose of simplified explanation, the DMRS is omitted in FIG. 3.

Base station device 3 sets and broadcasts sounding subframes that are subframes for reserving a radio resource used for mobile station device 1 transmitting the SRS, and a bandwidth of the radio resource reserved for transmitting the SRS in the sounding subframes (the number of physical resource blocks). Furthermore, base station device 3 sets the radio resource and the sounding subframes used for actually transmitting the SRS for each mobile station device 1, and mobile station device 1 transmits the SRS in accordance with this setting. The SRS is mapped to the last SC-FDMA symbol in the subframe (the 14th SC-FDMA symbol in the subframe) without fail, as shown in FIG. 3.

<As to Contention Based Uplink Transmission>

Figure 4:
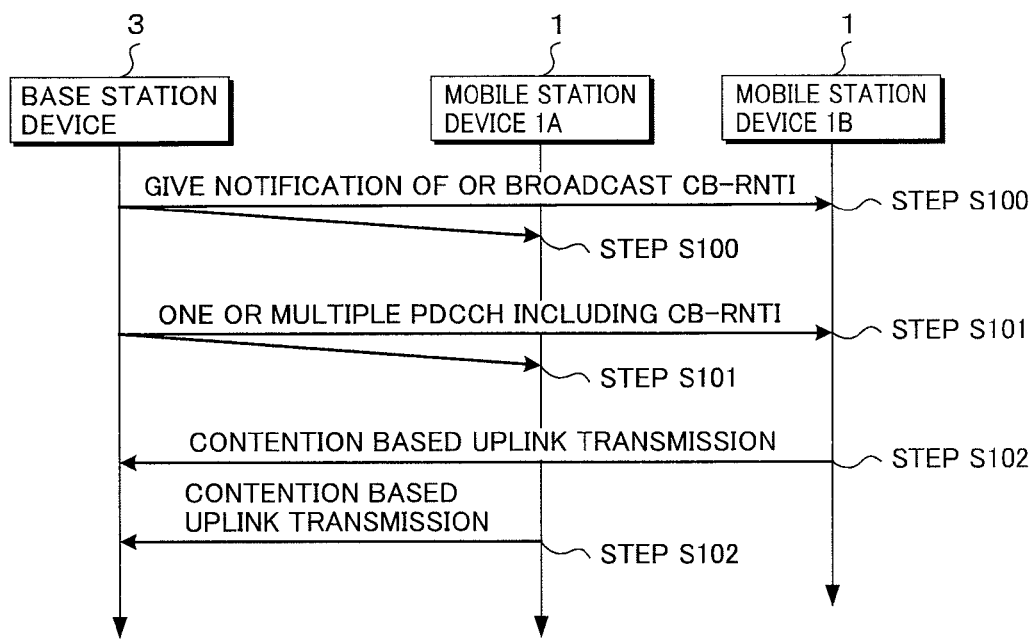
FIG. 4 is a sequential chart illustrating an example of contention-based uplink transmission according to the present invention.

FIG. 4 is a sequential chart illustrating an example of contention based uplink transmission according to the present invention. Base station device 3 determines a CB-RNTI code shared among mobile station devices 1 and notifies mobile station devices 1 performing contention based uplink transmission of the CB-RNTI (step S100). An agreement about the CB-RNTI code may be made in advance between base station device 3 and mobile station device 1 to skip step S101.

Base station device 3 determines allocation of a radio resource for contention based uplink transmission, maps the PDCCH including the CB-RNTI and information indicating the allocation of the radio resource to the common search space or the mobile-station-device-specific search space for a given mobile station device 1, and transmits them to mobile station device 1 (step S101). In the case where mobile station device 1 has successfully detected one or a plurality of PDCCHs including the CB-RNTI, mobile station device 1 selects one radio resource from the radio resources indicated by the detected PDCCH(s) including the CB-RNTI and performs contention based uplink transmission (step S102). In step S102, mobile station device 1 can include the C-RNTI allocated by base station device 3 in the PUSCH and transmit this PUSCH, and base station device 3 can determine from the C-RNTI included in the PUSCH which mobile station device 1 has performed contention based uplink transmission.

<As to Configuration of Base Station Device 3>

Figure 5:
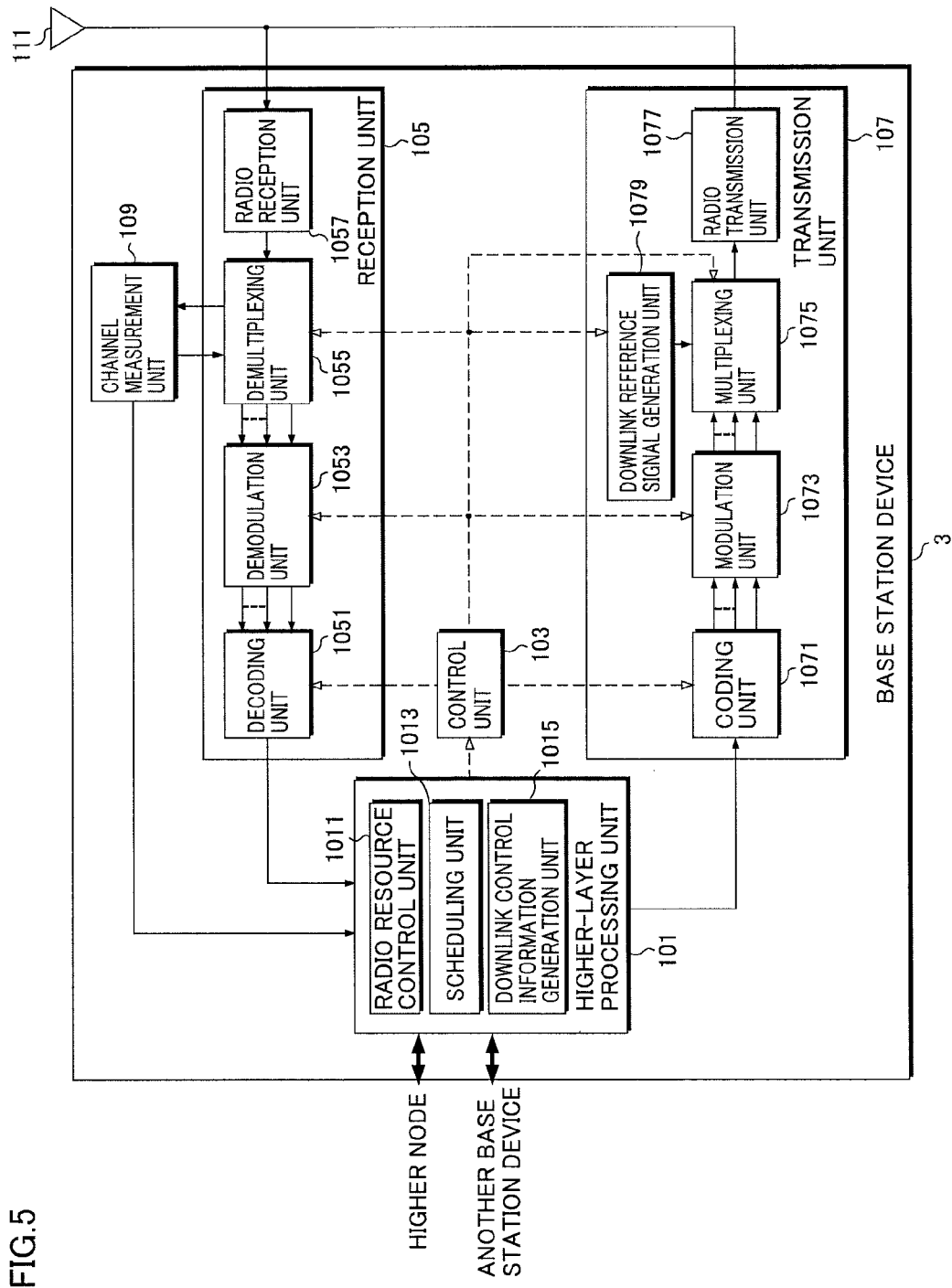
FIG. 5 is a schematic block diagram illustrating a configuration of a base station device 3 according to the present invention.

FIG. 5 is a schematic block diagram illustrating a configuration of base station device 3 according to the present invention. As shown, base station device 3 is configured to include a higher-layer processing unit 101, a control unit 103, a reception unit 105, a transmission unit 107, a channel measurement unit 109, and a transmission/reception antenna 111. Higher-layer processing unit 101 is configured to include a radio resource control unit 1011, a scheduling unit 1013, and a downlink control information generation unit 1015. Reception unit 105 is configured to include a decoding unit 1051, a demodulation unit 1053, a demultiplexing unit 1055, and a radio reception unit 1057. Transmission unit 107 is configured to include a coding unit 1071, a modulation unit 1073, a multiplexing unit 1075, a radio transmission unit 1077, and a downlink reference signal generation unit 1079.

Higher-layer processing unit 101 performs processing for a packet data convergence protocol (PDCP) layer, a radio link control (RLC) layer, and a radio resource control (RRC) layer. In higher-layer processing unit 101, scheduling unit 1013 for example generates control information based on results such as scheduling results, for controlling reception unit 105 and transmission unit 107, and outputs the control information to control unit 103. Radio resource control unit 1011 included in higher-layer processing unit 101 generates, or obtains from a higher node, information to be mapped to the downlink PDSCH, and outputs the information to transmission unit 107. Radio resource control unit 1011 also manages a variety of setting information for each mobile station device 1. For example, radio resource control unit 1011 performs management of the RNTI, including allocation of the C-RNTI to mobile station device 1 and allocation of a code to the CB-RNTI.

Scheduling unit 1013 included in higher-layer processing unit 101 performs scheduling such as radio resource allocation, coding scheme setting, and modulation scheme setting, based on uplink control information (ACK/NACK, channel quality information, scheduling request) of which it is notified through the PUCCH by mobile station device 1, the uplink channel quality input from the channel measurement unit, the buffer status of which it is notified by mobile station device 1, and a variety of setting information for each mobile station device 1 that is set by radio resource control unit 1011. Scheduling unit 1013 allocates a radio resource to which the PUSCH is to be mapped by a specific mobile station device 1 and a radio resource to which the PUSCH is to be mapped for use in contention based uplink transmission by unspecified mobile station device 1, from among uplink radio resources. When scheduling unit 1013 is to allocate to a specific mobile station device 1 a radio resource to which the PUSCH is to be mapped, scheduling unit 1013 preferentially allocates a radio resource of high channel quality, based on the result of uplink channel measurement that is input by channel measurement unit 109. Then, scheduling unit 1013 allocates a radio resource for contention based uplink transmission, from among radio resources that have not been allocated to specific mobile station device 1.

Scheduling unit 1013 also determines a radio resource to which the PDSCH is to be mapped, from among downlink radio resources. Scheduling unit 1013 outputs control information to downlink control information generation unit 1015 so that it generates downlink control information indicating allocation of this radio resource. Scheduling unit 1013 further allocates one or a plurality of control channel elements to which the downlink control information generated by downlink control information generation unit 1015 is to be mapped that is/are included in the common search space or mobile-station-device-specific search space. Scheduling unit 1013 selects one or a plurality of control channel elements to which downlink control information including the C-RNTI is to be mapped, from the mobile-station-device-specific search space for mobile station device 1 to which the C-RNTI is allocated, and the common search space. Scheduling unit 1013 selects one or a plurality of control channel elements to which downlink control information including the CB-RNTI is to be mapped that is/are included in the common search space or a space where the common search space and mobile-station-device-specific search spaces for a plurality of mobile station devices 1 overlap. In the case where base station device 3 maps, to the mobile-station-device-specific search space, one or more control channel elements to which downlink control information including the CB-RNTI is mapped, respective mobile-station-device-specific search spaces for a plurality of mobile station devices 1 may not overlap each other.

Furthermore, scheduling unit 1013 allocates the radio resource for transmitting the SRS for each mobile station device 1 and the PUCCH radio resource for transmitting the channel quality information. Base station device 3 uses the PDSCH to transmit the radio resource control signal indicating allocation of the radio resource to mobile station device 1.

Downlink control information generation unit 1015 included in higher-layer processing unit 101 generates downlink control information indicating allocation of uplink or downlink radio resource, based on the control information that is input from scheduling unit 1013. Downlink control information generation unit 1015 also generates a cyclic redundancy check code from the generated downlink control information, scrambles the generated cyclic redundancy check code with the RNTI, and attaches it to the downlink control information. In the case where the downlink control information indicates allocation of a radio resource to a specific mobile station device 1, downlink control information generation unit 1015 scrambles the cyclic redundancy check code with the C-RNTI allocated to this mobile station device 1. In the case where the downlink control information indicates radio resource allocation for contention based uplink transmission, downlink control information generation unit 1015 scrambles the cyclic redundancy check code with the CB-RNTI. Downlink control information generation unit 1015 generates the downlink control information including the C-RNTI and the downlink control information including the CB-RNTI in DCI formats with the same number of bits, or the same DCI formats.

Control unit 103 generates a control signal for controlling reception unit 105 and transmission unit 107, based on the control information from higher-layer processing unit 101. Control unit 103 outputs the generated control signal to reception unit 105 and transmission unit 107 and controls reception unit 105 and transmission unit 107.

In accordance with the control signal which is input from control unit 103, reception unit 105 demultiplexes, demodulates, and decodes a received signal which is received from mobile station device 1 through transmission/reception antenna 111, and outputs the decoded information to higher-layer processing unit 101. Radio reception unit 1057 converts (down-converts) an uplink signal received through transmission/reception antenna 111 into an intermediate frequency, removes unnecessary frequency components, controls the amplification level so that the signal level is appropriately kept, performs quadrature demodulation based on in-phase and quadrature components of the received signal, and converts the quadrature-demodulated analog signal into a digital signal. Radio reception unit 1057 removes, from the digital signal into which the analog signal is converted, a portion corresponding to a guard interval (GI). Radio reception unit 1057 performs fast Fourier transform (FFT) on the signal from which the guard interval is removed, extracts a signal of the frequency domain, and outputs it to demultiplexing unit 1055.

Demultiplexing unit 1055 demultiplexes the signal which is input from radio reception unit 1057 into signals such as PUCCH, PUSCH, and uplink reference signal. The signal is demultiplexed based on information about radio resource allocation which is determined in advance in base station device 3 by scheduling unit 1013 and of which each mobile station device 1 is notified. Demultiplexing unit 1055 also compensates for PUCCH and PUSCH propagation paths based on estimated values of the propagation paths that are input from channel measurement unit 109. Demultiplexing unit 1055 outputs the uplink reference signal obtained by demultiplexing, to channel measurement unit 109.

Demodulation unit 1053 performs inverse discrete Fourier transform (IDFT) on the PUSCH and obtains a modulation symbol. For the modulation symbol of PUCCH and PUSCH each, a modulation scheme is used which is determined in advance or of which each mobile station device 1 is notified in advance by base station device 3 by means of the downlink control information, such as binary phase shift keying (BPSK), quadrature phase shift keying (QPSK), 16 quadrature amplitude modulation (16QAM), or 64 quadrature amplitude modulation (64QAM), and accordingly demodulation unit 1053 demodulates the received signal.

Decoding unit 1051 decodes coded bits of the demodulated PUCCH and PUSCH based on a predetermined coding scheme and at a code rate which is determined in advance or of which mobile station device 1 is informed in advance by base station device 3 through uplink grant, and outputs the decoded data information and the uplink control information to higher-layer processing unit 101. Channel measurement unit 109 measures, from the uplink reference signal which is input from demultiplexing unit 1055, the estimated values of the propagation paths and the uplink channel quality for example, and outputs them to demultiplexing unit 1055 and higher-layer processing unit 101.

Transmission unit 107 generates a downlink reference signal in accordance with the control signal which is input from control unit 103, codes and modulates the data information and the downlink control information that are input from higher-layer processing unit 101, multiplexes the PDCCH, PDSCH and downlink reference signal, and transmits the signal to mobile station device 1 through transmission/reception antenna 111.

Coding unit 1071 performs, on the downlink control information and the data information that are input from higher-layer processing unit 101, coding which is determined in advance or determined by scheduling unit 1013 such as turbo coding, convolutional coding, or block coding. Modulation unit 1073 modulates the coded bits that are input from coding unit 1071 in accordance with a modulation scheme which is determined in advance or determined by scheduling unit 1013, such as QPSK, 16QAM, or 64QAM. Downlink reference signal generation unit 1079 generates a sequence that has already been known by mobile station device 1, as a downlink reference signal that is determined in accordance with a predetermined rule based on a cell identifier (cell ID) for identifying base station device 3. Multiplexing unit 1075 multiplexes the modulated channels each and the generated downlink reference signal.

Radio transmission unit 1077 performs inverse fast Fourier transform (IFFT) on the multiplexed demodulated symbol to modulate it based on the OFDM scheme, adds a guard interval to the OFDM-modulated OFDM symbol, generates a baseband digital signal, converts the baseband digital signal into an analog signal, generates in-phase and quadrature components of an intermediate frequency from the analog signal, removes excess frequency components relative to the intermediate frequency band, converts (up-converts) the intermediate frequency signal into a high frequency signal, removes excess frequency components, amplifies the electric power, and outputs it to transmission/reception antenna 111 for transmitting it.

<As to Configuration of Mobile Station Device 1>

Figure 6:
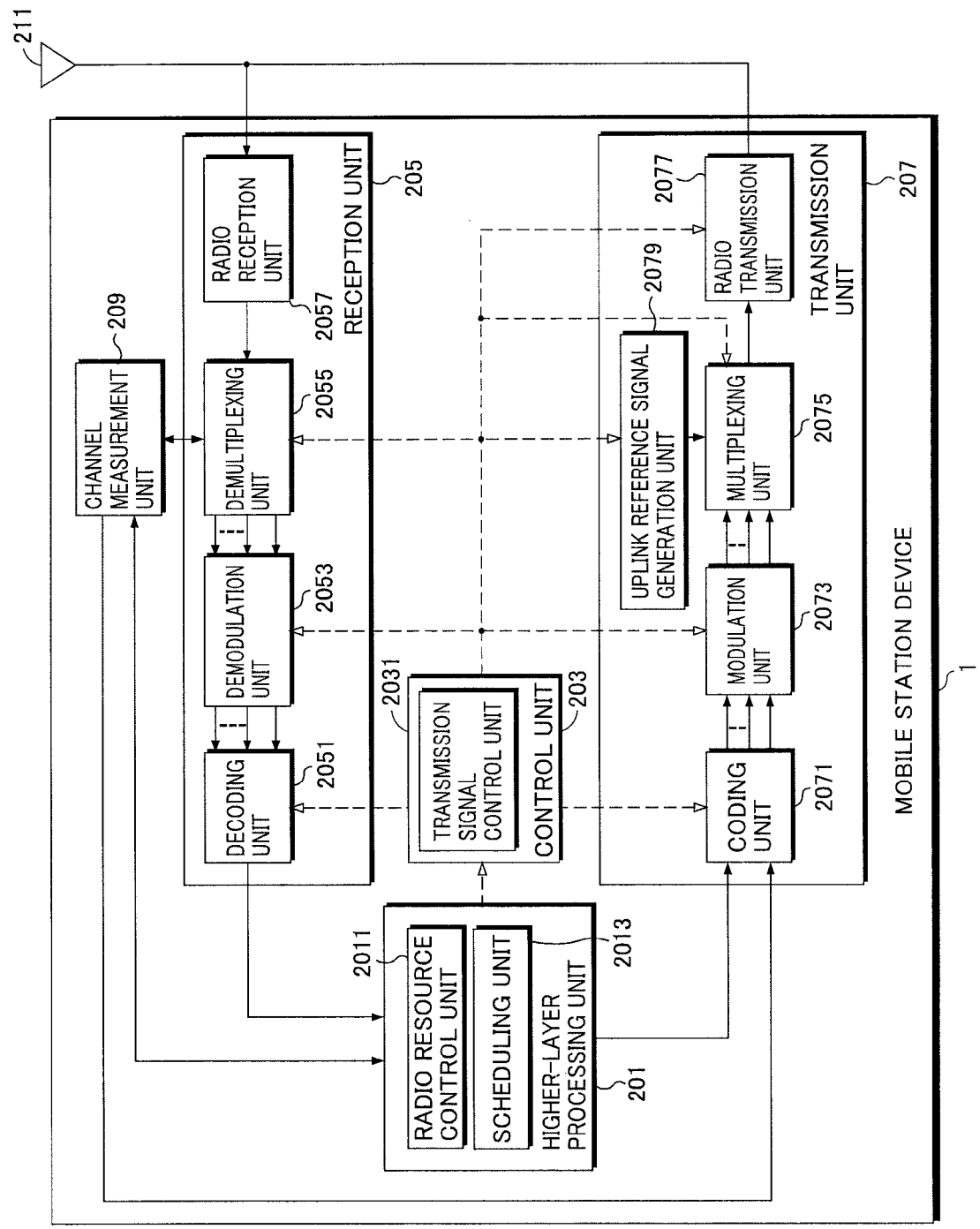
FIG. 6 is a schematic block diagram illustrating a configuration of a mobile station device 1 according to the present invention.

FIG. 6 is a schematic block diagram illustrating a configuration of mobile station device 1 according to the present embodiment. As shown, mobile station device 1 is configured to include a higher-layer processing unit 201, a control unit 203, a reception unit 205, a transmission unit 207, a channel measurement unit 209, and a transmission/reception antenna 211. Higher-layer processing unit 201 is configured to include a radio resource control unit 2011 and a scheduling unit 2013. Control unit 203 is configured to include a transmission signal control unit 2031. Reception unit 205 is configured to include a decoding unit 2051, a demodulation unit 2053, a demultiplexing unit 2055, and a radio reception unit 2057. Transmission unit 207 is configured to include a coding unit 2071, a modulation unit 2073, a multiplexing unit 2075, a radio transmission unit 2077, and an uplink reference signal generation unit 2079.

Higher-layer processing unit 201 outputs, to transmission unit 207, uplink data information generated for example by user operation. Higher-layer processing unit 201 also performs processing for a packet data convergence protocol layer, a radio link control layer, and a radio resource control layer. Higher-layer processing unit 201 generates control information for controlling reception unit 205 and transmission unit 207 based on downlink control information for example, and outputs the generated control information to control unit 203. Radio resource control unit 2011 included in higher-layer processing unit 201 manages a variety of setting information for the mobile station device itself. For example, radio resource control unit 2011 manages RNTI such as C-RNTI and CB-RNTI. Radio resource control unit 2011 also generates information to be mapped to each uplink channel and outputs the generated information to transmission unit 207.

Scheduling unit 2013 included in higher-layer processing unit 201 generates control information for controlling reception unit 205 and transmission unit 207, based on (i) the downlink control information of which the mobile station device is informed by base station device 3 through the PDCCH and (ii) a variety of setting information for the mobile station device, such as a radio resource for transmitting the SRS and the PUCCH radio resource to which the channel quality information is transmitted, that is set by the radio resource control signal of which the mobile station device is informed through the PDSCH and that is managed by radio resource control unit 2011, and outputs the generated control information to control unit 203. Scheduling unit 2013 generates control information for controlling reception unit 205 so that the reception unit performs blind decoding on the downlink control information in the DCI format to be detected by mobile station device 1, in the common search space and/or the mobile-station-device-specific search space, and outputs the generated control information to control unit 203. Scheduling unit 2013 generates the control information for controlling reception unit 205 so that the reception unit performs blind decoding on the PDCCH including the C-RNTI in the common search space and the mobile-station-device-specific search space and performs blind decoding on the PDCCH including the CB-RNTI in the common search space or in the common search space and the mobile-station-device-specific search space, and outputs the generated control information to control unit 203.

It should be noted that scheduling unit 2013 may generate the control information for controlling reception unit 205 so that reception unit 205 does not perform blind decoding on the PDCCH including the CB-RNTI in every case but performs blind decoding on the PDCCH including the CB-RNTI only in the case where a PUSCH radio resource dedicated to the mobile station device has not been allocated by base station device 3 while there is data information to be mapped to the PUSCH, and outputs the generated control information to control unit 203. Scheduling unit 2013 generates the control information for controlling reception unit 205 so that it demultiplexes, demodulates and decodes the PDSCH based on downlink assignment that is input from reception unit 205 and controlling transmission unit 207 so that it codes, modulates and multiplexes the PUSCH based on uplink grant that is input from reception unit 205, and outputs the generated control information to control unit 203.

Scheduling unit 2013 generates the control information for controlling transmission unit 207 so that it selects the whole radio resources indicated by the uplink grant in the case where the uplink grant includes the C-RNTI allocated to the mobile station device itself, or randomly selects one radio resource from a plurality of radio resources indicated by the uplink grant in the case where the uplink grant includes the CB-RNTI, and multiplexes the PUSCH on the selected radio resource, and scheduling unit 2013 outputs the generated control information to control unit 203. Scheduling unit 2013 also generates the control information for controlling transmission unit 207 so that it selects one radio resource at random from the whole of a plurality of radio resources indicated by a plurality of uplink grants each indicating a plurality of radio resources and multiplexes the PUSCH on the selected radio resource, in the case where the plurality of uplink grants including the CB-RNTI have successfully been blind-decoded, and scheduling unit 2013 outputs the generated control information to control unit 203.

Control unit 203 generates a control signal for controlling reception unit 205 and transmission unit 207, based on the control information from higher-layer processing unit 201. Control unit 203 outputs the generated control signal to reception unit 205 and transmission unit 207 and controls reception unit 205 and transmission unit 207. When the PUSCH instructed to be transmitted by the scheduling unit, the PUCCH (channel quality information and/or ACK/NACK) and the SRS collide with one another in the same uplink subframe, transmission signal control unit 2031 included in control unit 203 determines which signal is to be transmitted.

When ACK/NACK and the PUSCH allocated by the uplink grant including the C-RNTI collide with each other in the same uplink subframe, transmission signal control unit 2031 transmits data information and ACK/NACK on the PUCSCH. When the channel quality information and the PUSCH allocated by the uplink grant including the C-RNTI collide with each other in the same uplink subframe, transmission signal control unit 2031 transmits the data information and the channel quality information on the PUCSCH. When the SRS and the PUSCH allocated by the uplink grant including the C-RNTI collide with each other in the same uplink subframe, transmission signal control unit 2031 transmits the PUSCH with the first to 13th SC-FDMA symbols in the uplink subframe, and transmits the SRS with the 14th SC-FDMA symbol. Also described later will be the case where the PUSCH allocated by the uplink grant including the CB-RNTI collide with the PUCCH and/or the SRS.

In accordance with the control signal which is input from control unit 203, reception unit 205 demultiplexes, demodulates and decodes a received signal which is received from base station device 3 through transmission/reception antenna 211, and outputs the decoded information to higher-layer processing unit 201. Radio reception unit 2057 converts (down-converts) a downlink signal received through transmission/reception antenna 211 into an intermediate frequency. Radio reception unit 2057 also removes unnecessary frequency components, controls the amplification level so that the signal level is appropriately kept. Radio reception unit 2057 performs quadrature demodulation based on in-phase and quadrature components of the received signal, and then, converts the quadrature-demodulated analog signal into a digital signal. Furthermore, radio reception unit 2057 removes a portion corresponding to a guard interval from the digital signal into which the analog signal is converted, Radio reception unit 2057 then performs fast Fourier transform on the signal from which the guard interval is removed, and extracts a signal of the frequency domain.

Demultiplexing unit 2055 demultiplexes the extracted signal into PDCCH, PDSCH and downlink reference signal. The signal is demultiplexed based on for example information about radio resource allocation of which the mobile station device is informed through the downlink control information. Demultiplexing unit 2055 also compensates for PDCCH and PDSCH propagation paths based on estimated values of the propagation paths that are input from channel measurement unit 209. Demultiplexing unit 2055 outputs the downlink reference signal obtained by demultiplexing, to channel measurement unit 209.

Demodulation unit 2053 performs demodulation on the PDCCH based on the QPSK modulation scheme, and outputs it to decoding unit 2051. Decoding unit 2051 tries to perform blind decoding on the PDCCH and, when decoding unit 2051 has successfully performed blind decoding, it outputs to higher-layer processing unit 201 the decoded downlink control information and the RNTI included in the downlink control information. Demodulation unit 2053 performs demodulation on the PDSCH based on a modulation scheme of which the mobile station device is informed through the downlink control information, such as QPSK, 16QAM, or 64QAM, and outputs it to decoding unit 2051. Decoding unit 2051 performs decoding on the code rate of which the mobile station device is informed through the downlink control information, and outputs the decoded data information to higher-layer processing unit 201.

Channel measurement unit 209 measures the downlink path loss and the channel quality information from the downlink reference signal which is input from demultiplexing unit 2055, and outputs the measured path loss to higher-layer processing unit 201 and also outputs the measured channel quality to transmission unit 207. Channel measurement unit 209 also calculates the estimated values of the downlink propagation paths from the downlink reference signal, and outputs them to demultiplexing unit 2055.

In accordance with the control signal which is input from control unit 203, transmission unit 207 generates the uplink reference signal (SRS and/or DMRS), codes and modulates data information which is input from higher-layer processing unit 201, multiplexes the PUCCH, PUSCH and the generated uplink reference signal, and outputs them to base station device 3 through transmission/reception antenna 211. Coding unit 2071 performs coding such as convolutional coding or block coding, on the uplink control information which is input from higher-layer processing unit 201, and performs turbo coding on the data information based on the code rate of which the mobile station device is informed through the downlink control information. Modulation unit 2073 modulates the coded bits that are input from coding unit 2071 based on a modulation scheme of which the mobile station device is informed through the downlink control information or determined in advance for each channel, such as BPSK, QPSK, 16QAM, or 64QAM.

Uplink reference signal generation unit 2079 generates a sequence that has already been known by base station device 3 that is determined in accordance with a predetermined rule based on a cell identifier for identifying base station device 3 and a bandwidth where the SRS or the DMRS is mapped, for example. Multiplexing unit 2075 rearranges PUSCH modulation symbols in parallel with each other in accordance with the control signal which is input from control unit 203, then performs discrete Fourier transform (DFT) and multiplexes the PUCCH and PUSCH signals and the generated SRS and DMRS.

Radio transmission unit 2077 performs, on the multiplexed signal, inverse fast Fourier transform to modulate it based on the SC-FDMA scheme, adds a guard interval to the SC-FDMA-modulated SC-FDMA symbol, generates a baseband digital signal, converts the baseband digital signal into an analog signal, generates in-phase and quadrature components of an intermediate frequency from the analog signal, removes excess frequency components relative to the intermediate frequency, converts (up-converts) the intermediate frequency signal into a high frequency signal, removes excess frequency components, amplifies the electric power, and outputs it to transmission/reception antenna 211 for transmitting it.

<As to Operation of Mobile Station Device>

Figure 7:
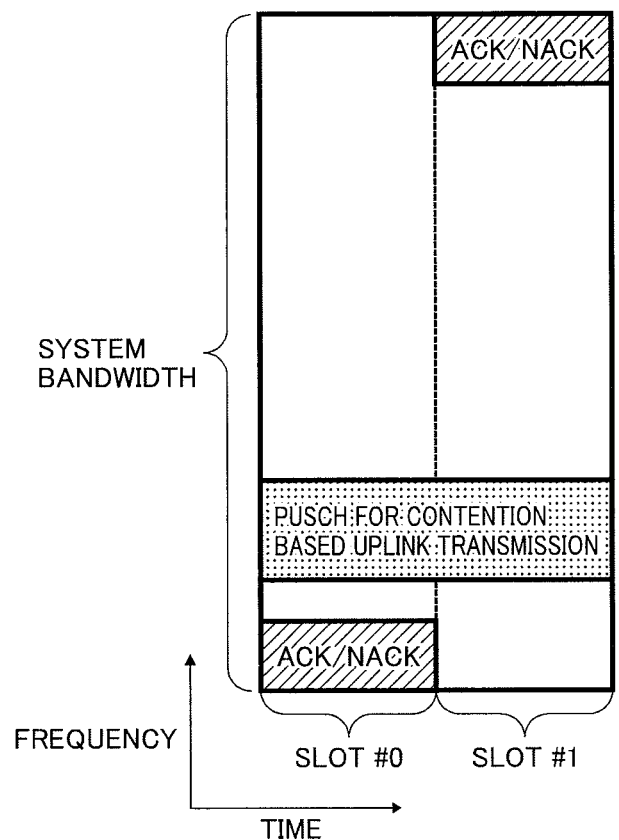
FIG. 7 is a diagram illustrating an example of radio resource allocation for ACK/NACK and contention based uplink transmission according the present invention.
Figure 8:
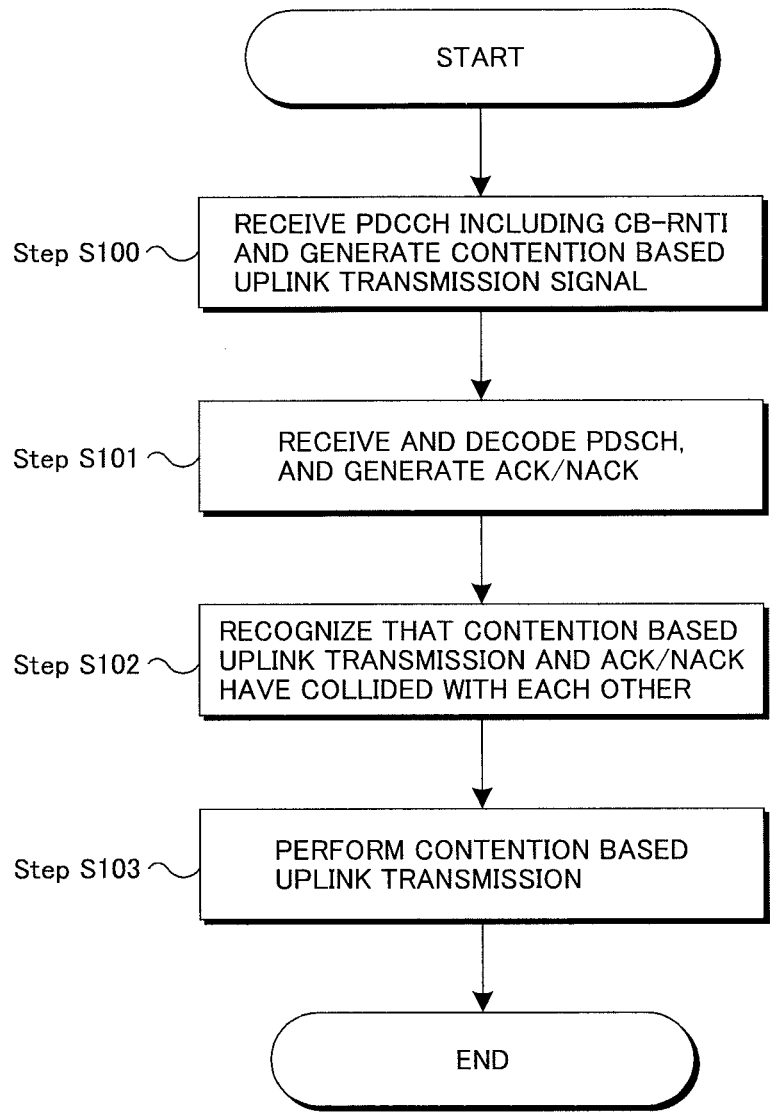
FIG. 8 is a flowchart showing an example operation of mobile station device 1 according to the first embodiment of the present invention.

FIG. 7 is a diagram illustrating an example of radio resource allocation for the ACK/NACK and the contention based uplink transmission signal according the present invention. When the ACK/NACK and the contention based uplink transmission signal collide with each other in the same uplink subframe as shown in FIG. 7, mobile station device 1 performs contention based uplink transmission without transmitting ACK/NACK. FIG. 8 is a flowchart showing an example operation of mobile station device 1 according to the first embodiment of the present invention. Mobile station device 1 receives the PDCCH including the CB-RNTI and/or the PUSCH radio resource allocation for contention based uplink transmission and which is transmitted by base station device 3 in a downlink subframe, and generates a contention based uplink transmission signal to be transmitted in the uplink subframe appearing a predetermined time after a downlink subframe by which the PDCCH was received (step S100).

Mobile station device 1 (i) receives the PDSCH transmitted from base station device 3 to the mobile station device itself in a downlink subframe, (ii) decodes the received PDSCH, and (iii) generates ACK/NACK for the PDSCH transmitted in the uplink subframe appearing a predetermined time after a downlink subframe by which the PDCCH was received (step S101). When mobile station device 1 recognizes that the contention based uplink transmission signal and the ACK/NACK have collided with each other in the same uplink subframe (step S102), mobile station device 1 transmits the contention based uplink transmission signal without transmitting ACK/NACK (step S103). Consequently, mobile station device 1 can perform contention based uplink transmission without delay. This allows mobile station device 1 to provide improved uplink latency.

In addition, when ACK/NACK and the contention based uplink transmission signal collide with each other in the same uplink subframe, downlink communication can be normally continued without transmitting ACK/NACK from mobile station device 1. Specifically, when mobile station device 1 does not transmit ACK/NACK, base station device 3 determines that mobile station device 1 has not received the PDSCH, and then, base station device 3 retransmits the PDSCH. When mobile station device 1 has not transmitted ACK, base station device 3 only has to transmit ACK to the retransmitted PDSCH. When mobile station device 1 has not transmitted NACK, base station device 3 only has to perform decoding using the retransmitted PDSCH.

Furthermore, the transmission power for contention based uplink transmission exceeds the transmission power that can be physically transmitted by mobile station device 1 or the maximum transmission power that is set for mobile station device 1 by base station device 3, mobile station device 1 may transmit ACK/NACK without performing contention based uplink transmission. Consequently, mobile station device 1 can transmit ACK/NACK with reliability.

First Modification of First Embodiment

Then, the first modification of the first embodiment according to the present invention will be hereinafter described.

Figure 9:
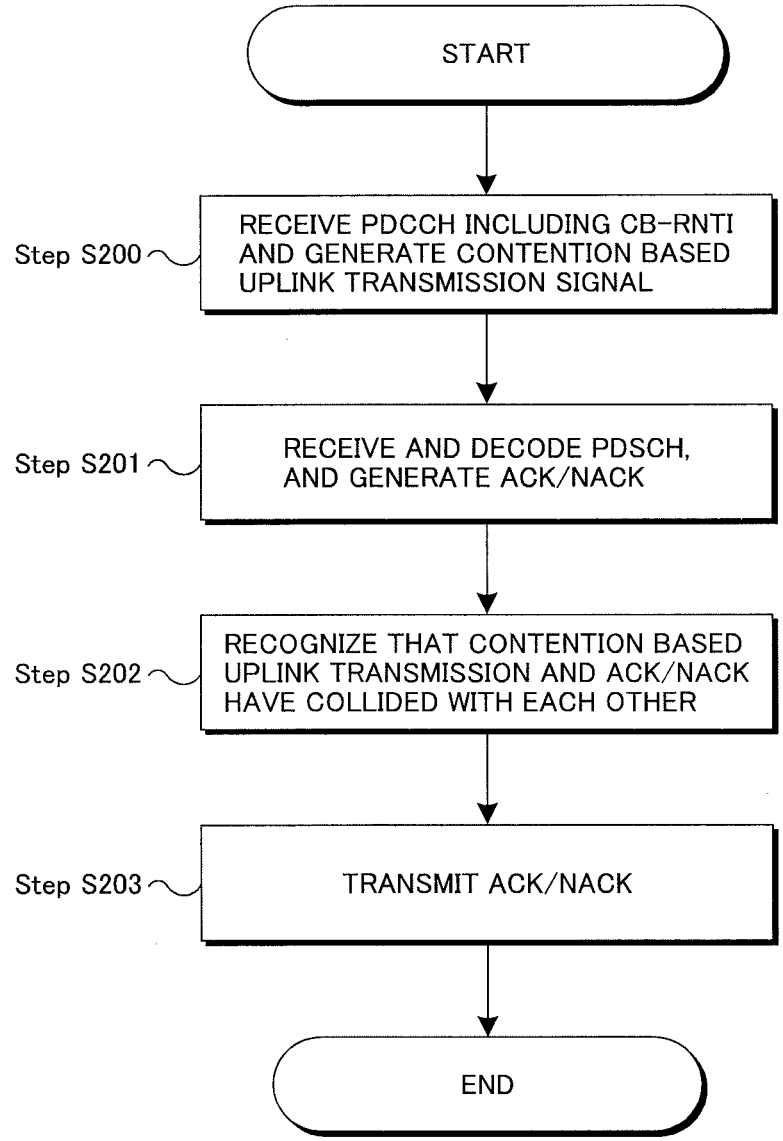
FIG. 9 is a flowchart showing an example operation of mobile station device 1 according to the first modification of the first embodiment of the present invention.

In the first modification of the first embodiment according to the present invention, when ACK/NACK and the contention based uplink transmission signal collide with each other in the same uplink subframe as shown in FIG. 7, mobile station device 1 transmits ACK/NACK without performing contention based uplink transmission. FIG. 9 is a flowchart showing an example operation of mobile station device 1 according to the first modification of the first embodiment of the present invention. Mobile station device 1 (i) receives the PDCCH including the CB-RNTI and/or the PUSCH radio resource allocation for contention based uplink transmission and which is transmitted by base station device 3 in a downlink subframe, and (ii) generates a contention based uplink transmission signal to be transmitted in the uplink subframe appearing a predetermined time after a downlink subframe by which the PDCCH was received (step S200).

Mobile station device 1 (i) receives the PDSCH transmitted from base station device 3 to the mobile station device itself in a downlink subframe, (ii) decodes the received PDSCH, and (iii) generates ACK/NACK for the PDSCH that is transmitted in the uplink subframe appearing a predetermined time after a downlink subframe by which the PDCCH was received (step S201). When mobile station device 1 recognizes that the contention based uplink transmission signal and ACK/NACK have collided with each other in the same uplink subframe (step S202), it transmits ACK/NACK without performing contention based uplink transmission (step S203). This allows mobile station device 1 to transmit ACK/NACK with reliability and prevents base station device 3 from uselessly retransmitting the PDSCH. When mobile station device 1 does not perform contention based uplink transmission, it only has to detect an uplink grant including the CB-RNTI in the subsequent subframes, and perform contention based uplink transmission. Alternatively, mobile station device 1 may transmit a scheduling request using the periodically allocated radio resource for scheduling request, so that the PUSCH radio resource dedicated to mobile station device 1 may be allocated to mobile station device 1 by base station device 3.

In addition, when uplink grant including the CB-RNTI and downlink assignment including the C-RNTI are simultaneously detected, mobile station device 1 may cancel uplink grant including the CB-RNTI. Accordingly, the ACK/NACK radio resource for the PDSCH for which the radio resource is indicated by the downlink assignment including the C-RNTI and the radio resource for contention based uplink transmission indicated by uplink grant including the CB-RNTI are prevented from colliding with each other in the same uplink subframe.

When ACK/NACK and the contention based uplink transmission signal collide with each other in the same uplink subframe, mobile station device 1 may select, depending on the type of data information which is transmitted by the PDSCH corresponding to ACK/NACK, whether ACK/NACK is not transmitted or contention based uplink transmission is not performed. For example, in the case where data information which is transmitted by the PDSCH corresponding to ACK/NACK is important information such as a radio resource control signal and an MAC (Medium Access Control) CE (Control Element), mobile station device 1 transmits ACK/NACK without performing contention based uplink transmission. When the data information which is transmitted by the PDSCH corresponding to ACK/NACK is information other than the above, mobile station device 1 may perform contention based uplink transmission without transmitting ACK/NACK.

Second Modification of First Embodiment

The second modification of the first embodiment according to the present invention will be hereinafter described.

Figure 10:
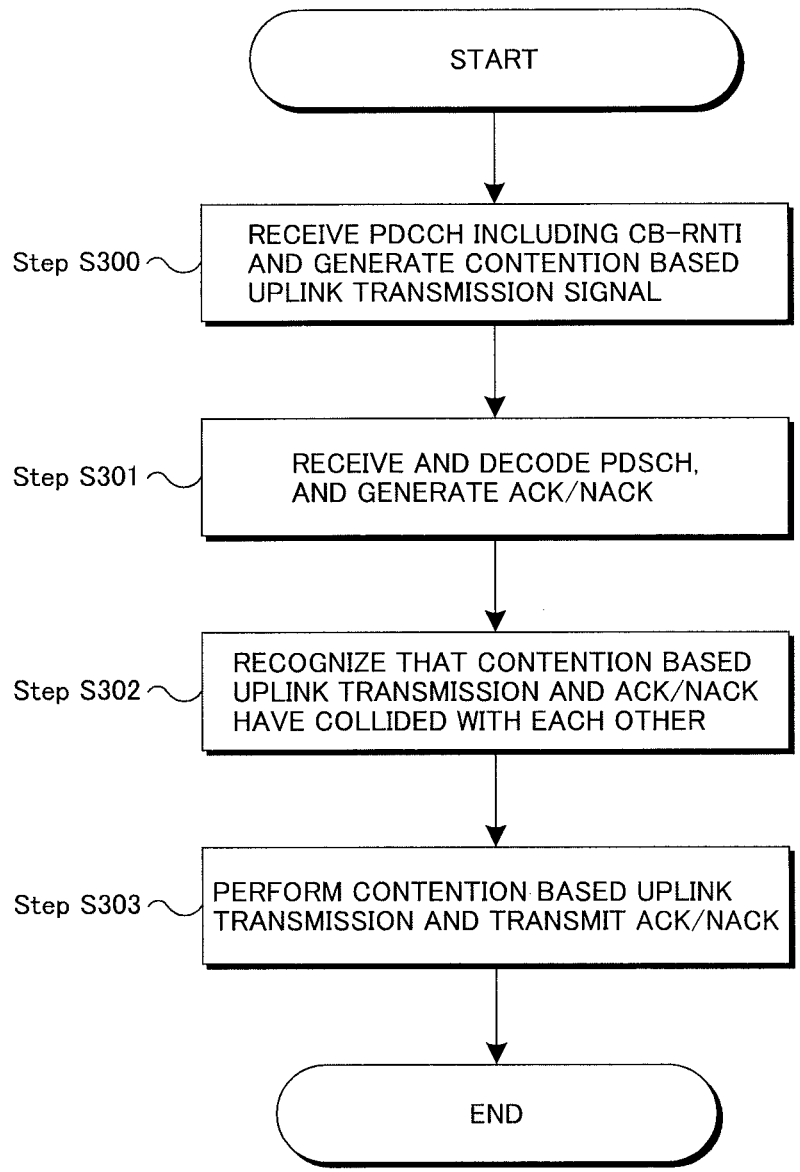
FIG. 10 is a flowchart showing an example operation of mobile station device 1 according to the second modification of the first embodiment of the present invention.

In the second modification of the first embodiment according to the present invention, when ACK/NACK and the contention based uplink transmission signal collide with each other in the same uplink subframe as shown in FIG. 7, mobile station device 1 simultaneously performs contention based uplink transmission and transmits ACK/NACK using their respective radio resources. FIG. 10 is a flowchart showing an example operation of mobile station device 1 according to the second modification of the first embodiment of the present invention. Mobile station device 1 receives the PDCCH including the CB-RNTI and/or the PUSCH radio resource allocation for contention based uplink transmission and which is transmitted by base station device 3 in a downlink subframe, and generates a contention based uplink transmission signal to be transmitted in the uplink subframe appearing a predetermined time after a downlink subframe by which the PDCCH is received (step S300).

Mobile station device 1 (i) receives the PDSCH transmitted from base station device 3 to the mobile station device itself in a downlink subframe, (ii) decodes the received PDSCH, and (iii) generates ACK/NACK for the PDSCH that is transmitted in the uplink subframe appearing a predetermined time after a downlink subframe by which the PDSCH was received (step S301). When mobile station device 1 recognizes that the contention based uplink transmission signal and ACK/NACK have collided with each other in the same uplink subframe (step S302), it performs the contention based uplink transmission and transmits ACK/NACK (step S303). This allows mobile station device 1 to perform contention based uplink transmission without delay. Furthermore, mobile station device 1 transmits ACK/NACK with reliability, so that base station device 3 can be prevented from uselessly retransmitting the PDSCH. However, in order to simultaneously transmit the contention based uplink transmission signal and ACK/NACK, relatively high transmission power is required as compared with the first embodiment and the first modification of the first embodiment.

In addition, mobile station device 1 transmits a power headroom report showing the remainder of the transmission power of mobile station device 1 to base station device 3. Then, based on the power headroom report, base station device 3 may set whether mobile station device 1 is allowed to simultaneously transmit the contention based uplink transmission signal and ACK/NACK or allowed to transmit only one of the signal and ACK/NACK. Consequently, depending on the remainder of the transmission power in mobile station device 1, base station device 3 can select the optimal method for transmitting the contention based uplink transmission signal and ACK/NACK.

Furthermore, in the case where mobile station device 1 is set in advance to simultaneously transmit the contention based uplink transmission signal and ACK/NACK, or even in the case where base station device 3 is set to simultaneously transmit a contention based uplink transmission signal and ACK/NACK, mobile station device 1 may transmit ACK/NACK without performing contention based uplink transmission when the total transmission power of the contention based uplink transmission signal and ACK/NACK exceeds the transmission power that can be physically transmitted by mobile station device 1 or the maximum transmission power set for mobile station device 1 by base station device 3. Consequently, mobile station device 1 can transmit ACK/NACK with reliability.

Second Embodiment

The second embodiment of the present invention will be hereinafter described.

Figure 11:
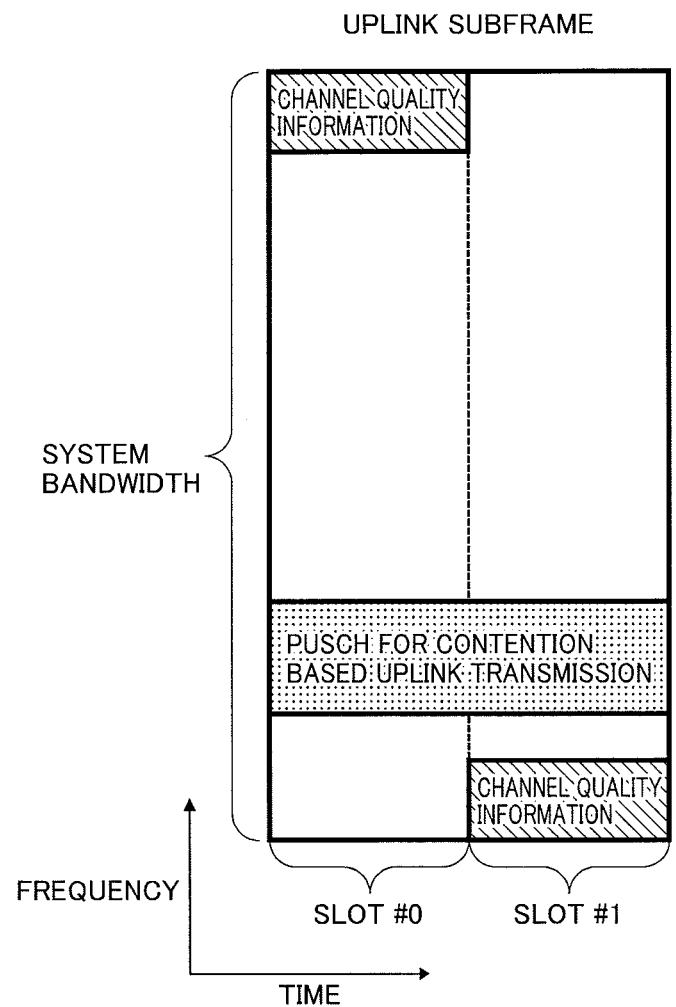
FIG. 11 is a diagram showing an example of radio resource allocation for channel quality information and contention based uplink transmission according to the present invention.
Figure 12:
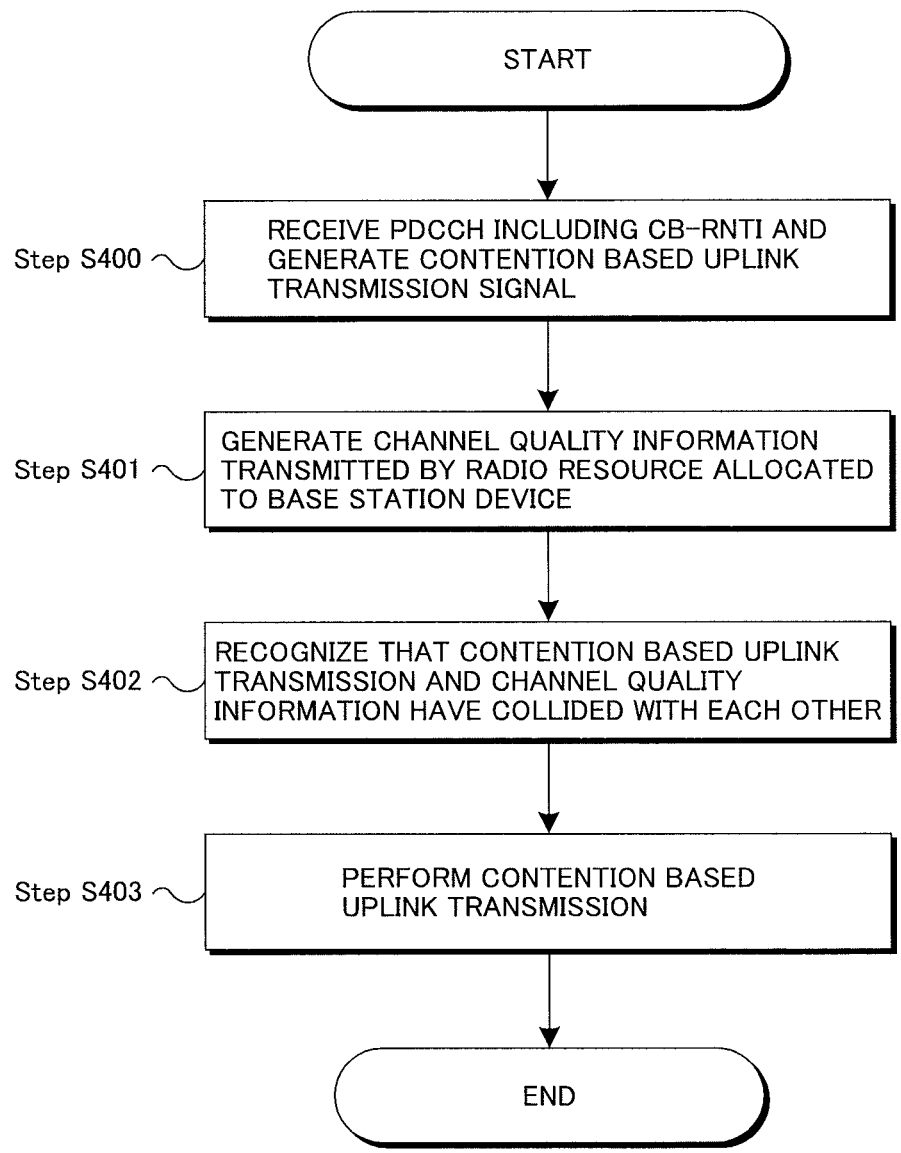
FIG. 12 is a flowchart showing an example operation of mobile station device 1 according to the second embodiment of the present invention.

FIG. 11 is a diagram showing an example of radio resource allocation for the channel quality information and the contention based uplink transmission signal according to the present invention. In the second embodiment of the present invention, when the channel quality information and the contention based uplink transmission signal collide with each other in the same uplink subframe as shown in FIG. 11, mobile station device 1 performs contention based uplink transmission without transmitting the channel quality information. FIG. 12 is a flowchart showing an example operation of mobile station device 1 according to the second embodiment of the present invention. Mobile station device 1 receives the PDCCH including the CB-RNTI and/or the PUSCH radio resource allocation for contention based uplink transmission and which is transmitted by base station device 3 in a downlink subframe, and generates a contention based uplink transmission signal to be transmitted in the uplink subframe appearing a predetermined time after a downlink subframe by which the PDCCH is received (step S400).

Mobile station device 1 generates channel quality information transmitted by the radio resource allocated to base station device 3 by calculation based on the received downlink reference signal (step S401). When mobile station device 1 recognizes that the contention based uplink transmission signal and the channel quality information have collided with each other in the same uplink subframe (step S302), it transmits the contention based uplink transmission signal without transmitting the channel quality information (step S303). This allows mobile station device 1 to perform contention based uplink transmission without delay. Consequently, mobile station device 1 can provide improved uplink latency.

First Modification of Second Embodiment

The first modification of the second embodiment according to the present invention will be hereinafter described.

Figure 13:
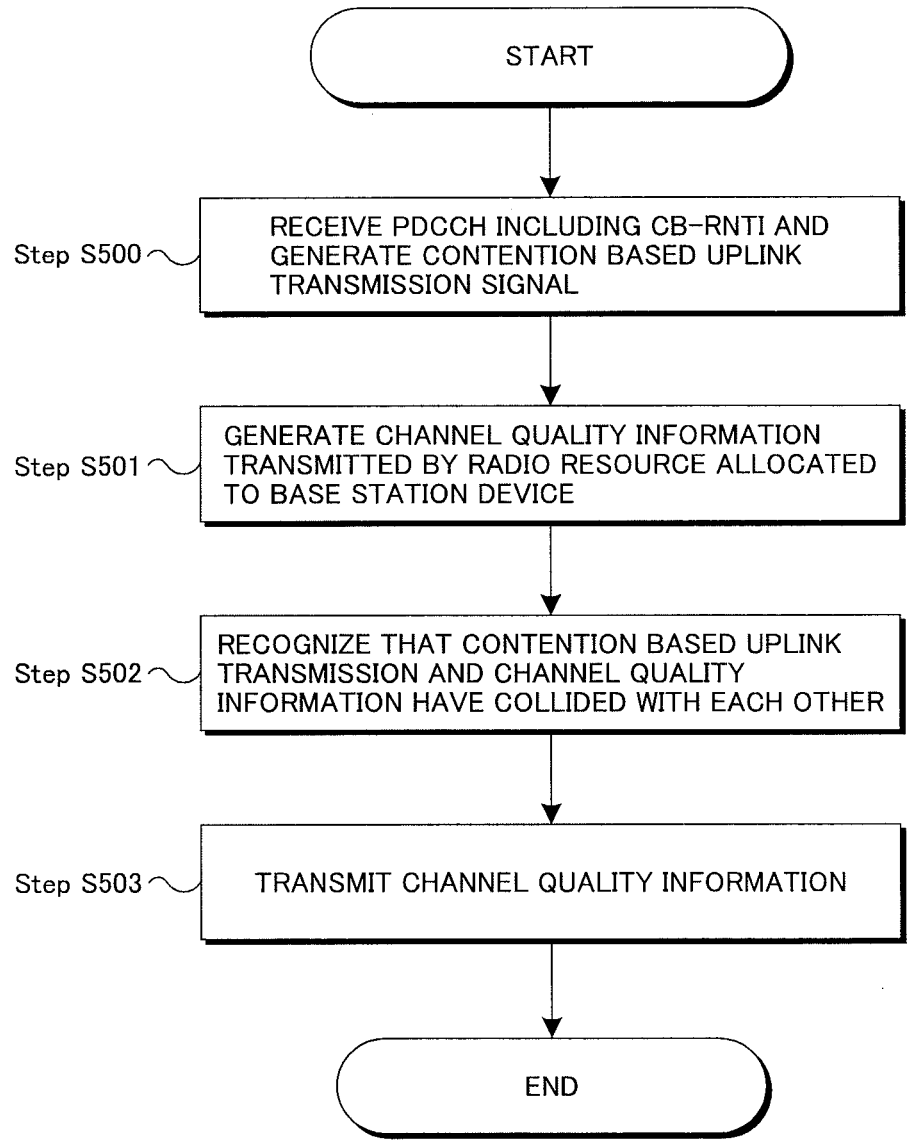
FIG. 13 is a flowchart showing an example operation of mobile station device 1 according to the first modification of the second embodiment of the present invention.

In the first modification of the second embodiment according to the present invention, when the channel quality information and the contention based uplink transmission signal collide with each other in the same uplink subframe as shown in FIG. 11, mobile station device 1 transmits the channel quality information without performing contention based uplink transmission. FIG. 13 is a flowchart showing an example operation of mobile station device 1 according to the first modification of the second embodiment of the present invention. Mobile station device 1 receives the PDCCH including the CB-RNTI and/or the PUSCH radio resource allocation for contention based uplink transmission and which is transmitted by base station device 3 in a downlink subframe, and generates a contention based uplink transmission signal to be transmitted in the uplink subframe appearing a predetermined time after a downlink subframe by which the PDCCH is received (step S500).

Mobile station device 1 generates channel quality information transmitted by the radio resource allocated to base station device 3 by calculation based on the received downlink reference signal (step S501). When mobile station device 1 recognizes that the contention based uplink transmission signal and the channel quality information have collided with each other in the same uplink subframe (step S502), it transmits the channel quality information without performing contention based uplink transmission (step S503). Accordingly, since mobile station device 1 can transmit the channel quality information to base station device 3 with reliability, base station device 3 can make an efficient schedule for the PDSCH in consideration of the channel quality information.

Second Modification of Second Embodiment

The second modification of the second embodiment according to the present invention will be hereinafter described.

Figure 14:
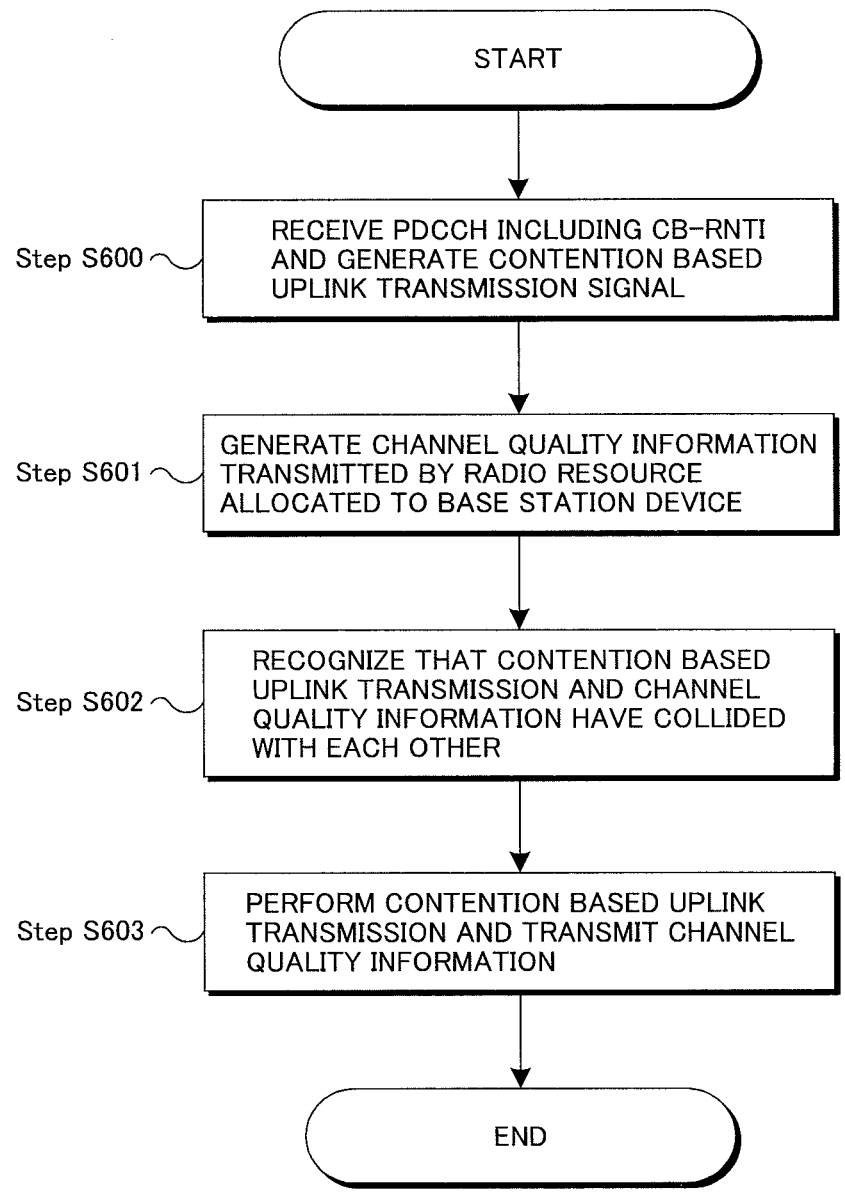
FIG. 14 is a flowchart showing an example operation of mobile station device 1 according to the second modification of the second embodiment of the present invention.

In the second modification of the second embodiment according to the present invention, when the channel quality information and the contention based uplink transmission signal collide with each other in the same uplink subframe as shown in FIG. 11, mobile station device 1 transmits both of the contention based uplink transmission signal and the channel quality information. FIG. 14 is a flowchart showing an example operation of mobile station device 1 according to the second modification of the second embodiment of the present invention. Mobile station device 1 receives the PDCCH including the CB-RNTI and/or the PUSCH radio resource allocation for contention based uplink transmission and which is transmitted by base station device 3 in a downlink subframe, and generates a contention based uplink transmission to be signal transmitted in the uplink subframe appearing a predetermined time after a downlink subframe by which the PDCCH is received (step S600).

Mobile station device 1 generates the channel quality information transmitted by the radio resource allocated to base station device 3 by calculation based on the received downlink reference signal (step S601). When mobile station device 1 recognizes that the contention based uplink transmission signal and the channel quality information have collided with each other in the same uplink subframe (step S602), it transmits both of the contention based uplink transmission signal and the channel quality information (step S603). Accordingly, since mobile station device 1 can transmit the channel quality information to base station device 3 with reliability, base station device 3 can make an efficient schedule for the PDSCH in consideration of the channel quality information. Furthermore, mobile station device 1 can perform contention based uplink transmission without delay. Consequently, mobile station device 1 can provide improved uplink latency.

In addition, base station device 3 can use uplink grant to instruct mobile station device 1 to transmit the channel quality information not including data. In this case, mobile station device 1 transmits only the channel quality information using the PUSCH. Also when the PUSCH transmitting only this channel quality information and the contention based uplink transmission signal collide with each other in the same uplink subframe, the second embodiment, the first modification of the second embodiment and the second modification of the second embodiment according to the present invention can be applied.

Third Embodiment

The third embodiment according to the present invention will be hereinafter described.

Figure 15:
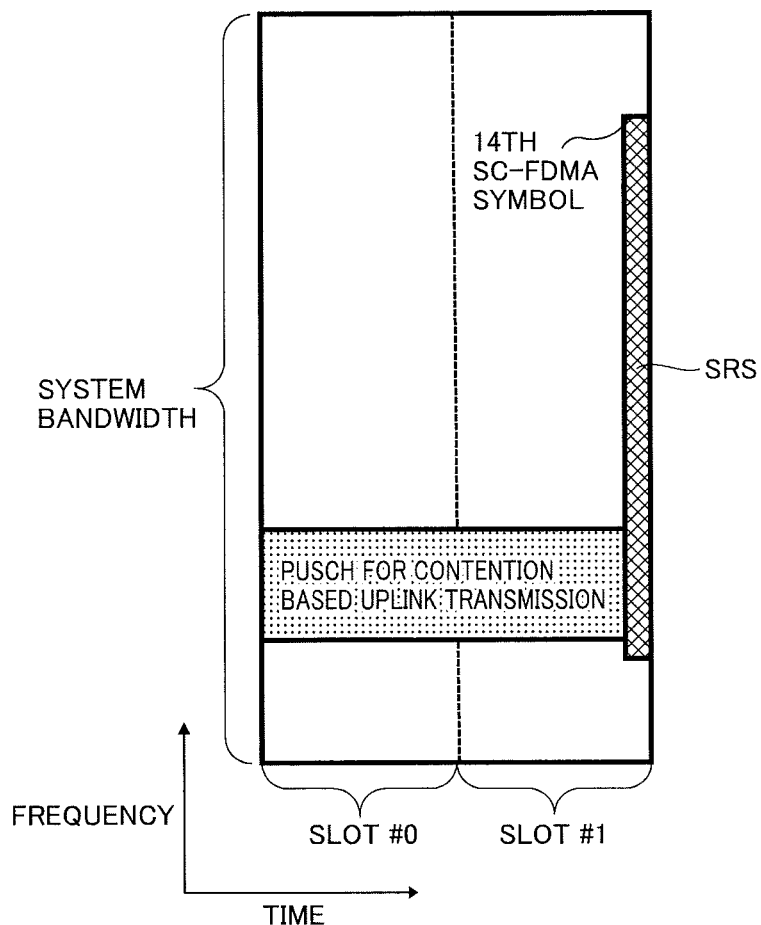
FIG. 15 is a diagram showing an example of radio resource allocation for an SRS and contention based uplink transmission according to the present invention.

In the third embodiment according to the present invention, when the frequency band of the radio resource reserved for transmitting the SRS and the PUSCH frequency band at least partially overlap with each other in the sounding subframe set by base station device 3, and also when mobile station device 1 transmits the PUSCH and the SRS in the same subframe, the PUSCH is not mapped to the 14th SC-FDMA symbol. Accordingly, mobile station device 1 can transmit the PUSCH with the first to 13th symbols in the same subframe, and transmit the SRS with the 14th SC-FDMA symbol. Furthermore, in the third embodiment according to the present invention, when the SRS and the PUSCH for contention based uplink transmission collide with each other in the same uplink subframe as shown in FIG. 15, mobile station device 1 performs contention based uplink transmission without transmitting the SRS.

Even when the sounding subframe serves as a subframe transmitting the SRS in which the frequency band of the radio resource reserved for transmitting the SRS and the PUSCH frequency band for contention based uplink transmission do not overlap with each other at all, mobile station device 1 maps the PUSCH for contention based uplink transmission to the first to 14th SC-FDMA symbols. In other words, irrespective of whether or not the sounding subframe is a subframe for transmitting the SRS, mobile station device 1 (i) maps the PUSCH for contention based uplink transmission to the first to 14th SC-FDMA symbols when the frequency band of the radio resource reserved for transmitting the SRS and the PUSCH frequency band for contention based uplink transmission do not overlap with each other, and (ii) maps the PUSCH for contention based uplink transmission to the first to 14th SC-FDMA symbols when the frequency band of the radio resource reserved for transmitting the SRS and the PUSCH frequency band for contention based uplink transmission at least partially overlap with each other.

Figure 16:
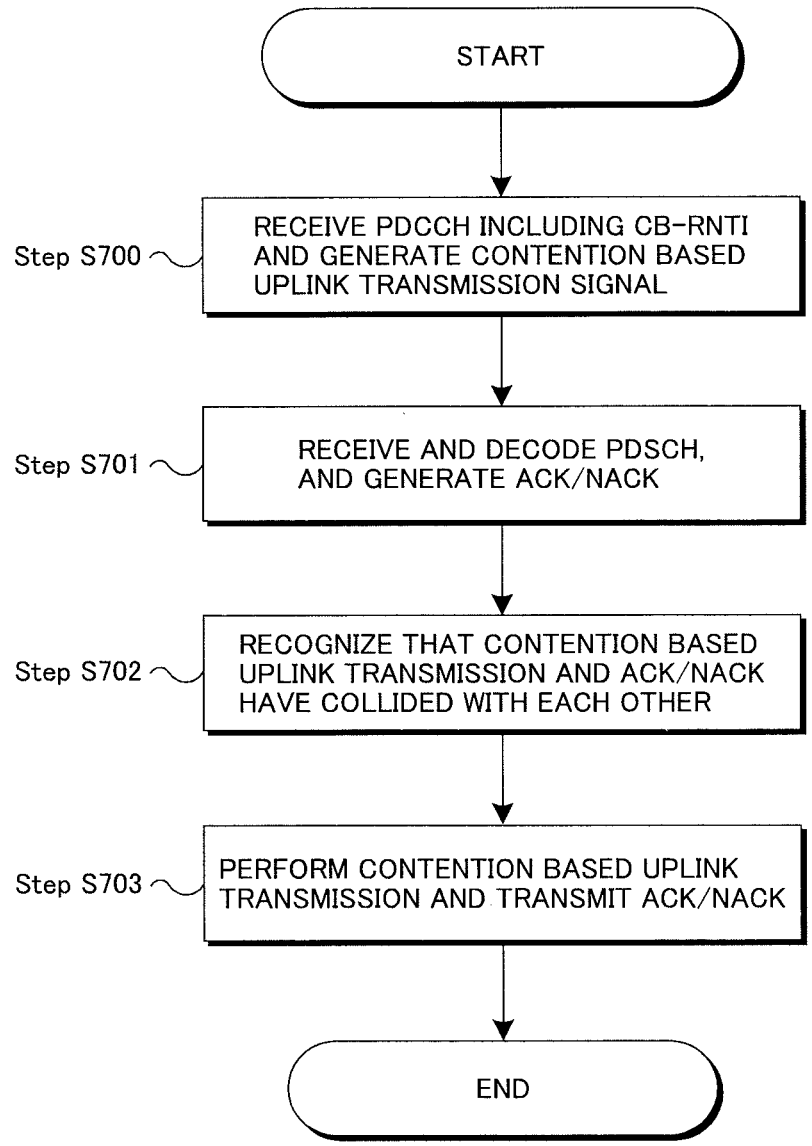
FIG. 16 is a flowchart showing an example operation of mobile station device 1 according to the third embodiment of the present invention.

Consequently, even when base station device 3 does not know whether mobile station device 1 performing contention based uplink transmission transmits the SRS or not, it can be informed of the SC-FDMA symbol to which the PUSCH for contention based uplink transmission is mapped. FIG. 16 is a flowchart showing an example operation of mobile station device 1 according to the third embodiment of the present invention. Mobile station device 1 receives the PDCCH including the CB-RNTI and/or the PUSCH radio resource allocation for contention based uplink transmission and which is transmitted by base station device 3 in a downlink subframe, and generates a contention based uplink transmission signal to be transmitted in the uplink subframe appearing a predetermined time after a downlink subframe by which the PDCCH is received (step S700).

Mobile station device 1 generates an SRS transmitted by the radio resource allocated to base station device 3 (step S701). When mobile station device 1 recognizes that the contention based uplink transmission signal and the SRS have collided with each other in the same uplink subframe (step S702), it transmits the contention based uplink transmission signal without transmitting the SRS (step S703).

Figure 17:
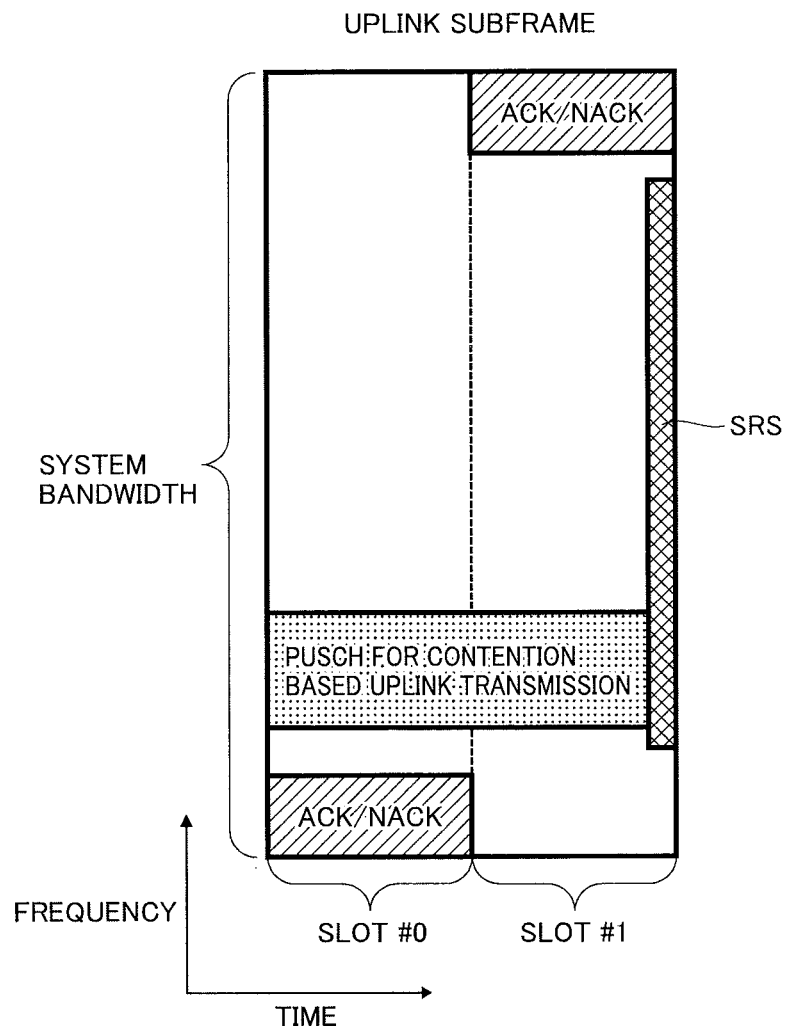
FIG. 17 is a diagram showing an example of radio resource allocation for ACK/NACK, the SRS and contention based uplink transmission according to the present invention.

In addition, at least two of the first embodiment (or the first modification of the first embodiment, the second modification of the first embodiment), the second embodiment (or the first modification of the second embodiment, the second modification of the second embodiment) and the third embodiment according to the present invention can be simultaneously applied to the radio communications system. For example, when the contention based uplink transmission signal, ACK/NACK and the SRS collide with one another in the same uplink subframe as shown in FIG. 17, mobile station device 1 (i) may perform contention based uplink transmission without transmitting ACK/NACK and the SRS, (ii) may transmit ACK/NACK without transmitting the SRS and performing contention based uplink transmission, (iii) may transmit ACK/NACK and the SRS without performing contention based uplink transmission, and (iv) may transmit the contention based uplink transmission signal, ACK/NACK and the SRS. In addition, when ACK/NACK and the SRS are simultaneously transmitted, mobile station device 1 transmits not ACK/NACK but only the SRS with the 14th SC-FDMA symbol.

Figure 18:
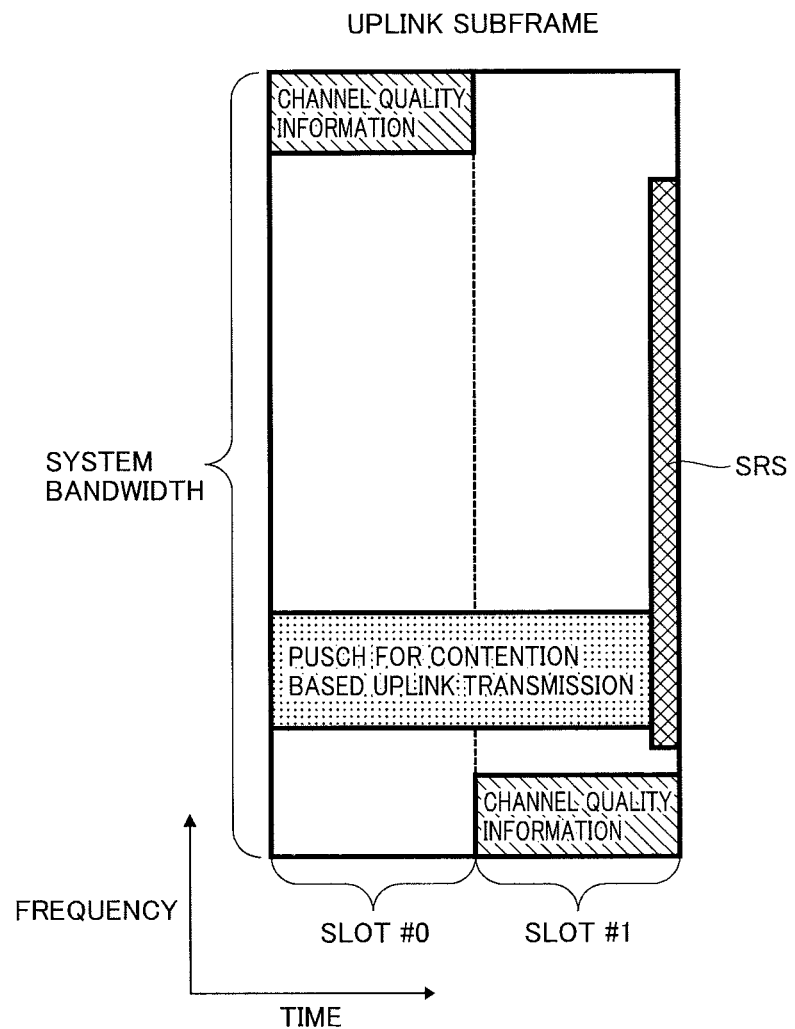
FIG. 18 is a diagram showing an example of radio resource allocation for the channel quality information, the SRS and contention based uplink transmission according to the present invention.

Furthermore, when the contention based uplink transmission signal, the channel quality information and the SRS collide with one another in the same uplink subframe as shown in FIG. 18, mobile station device 1 (i) may perform contention based uplink transmission without transmitting the channel quality information and the SRS, (ii) may transmit the channel quality information without transmitting the SRS and performing contention based uplink transmission, and (iii) may transmit the contention based uplink transmission signal and the channel quality information.

Figure 19:
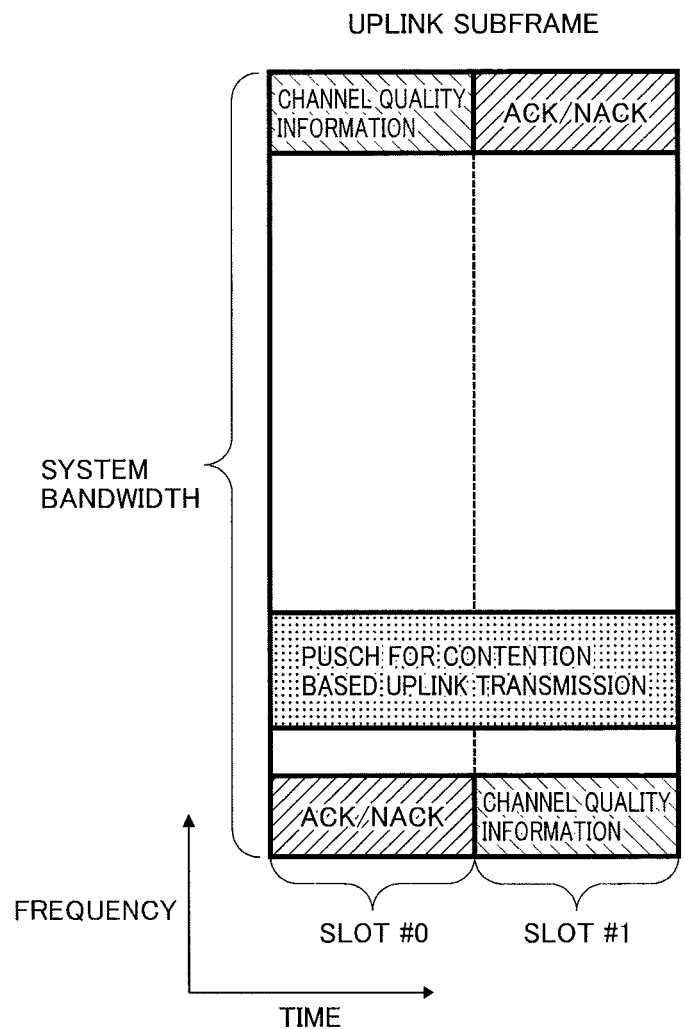
FIG. 19 is a diagram showing an example of radio resource allocation for ACK/NACK, the channel quality information and contention based uplink transmission according to the present invention.

Furthermore, when the contention based uplink transmission signal, ACK/NACK and the channel quality information collide with one another in the same uplink subframe as shown in FIG. 19, mobile station device 1 (i) may perform contention based uplink transmission without transmitting ACK/NACK and the channel quality information, (ii) may transmit ACK/NACK and the channel quality information without performing contention based uplink transmission, and (iii) may transmit the contention based uplink transmission signal, the CQI and ACK/NACK. In addition, when simultaneously transmitting ACK/NACK and the channel quality information, mobile station device 1 may transmit ACK/NACK and the channel quality information by separate PUCCH radio resources, or may transmit both ACK/NACK and the channel quality information by the PUCCH radio resource allocated to the channel quality information.

Figure 20:
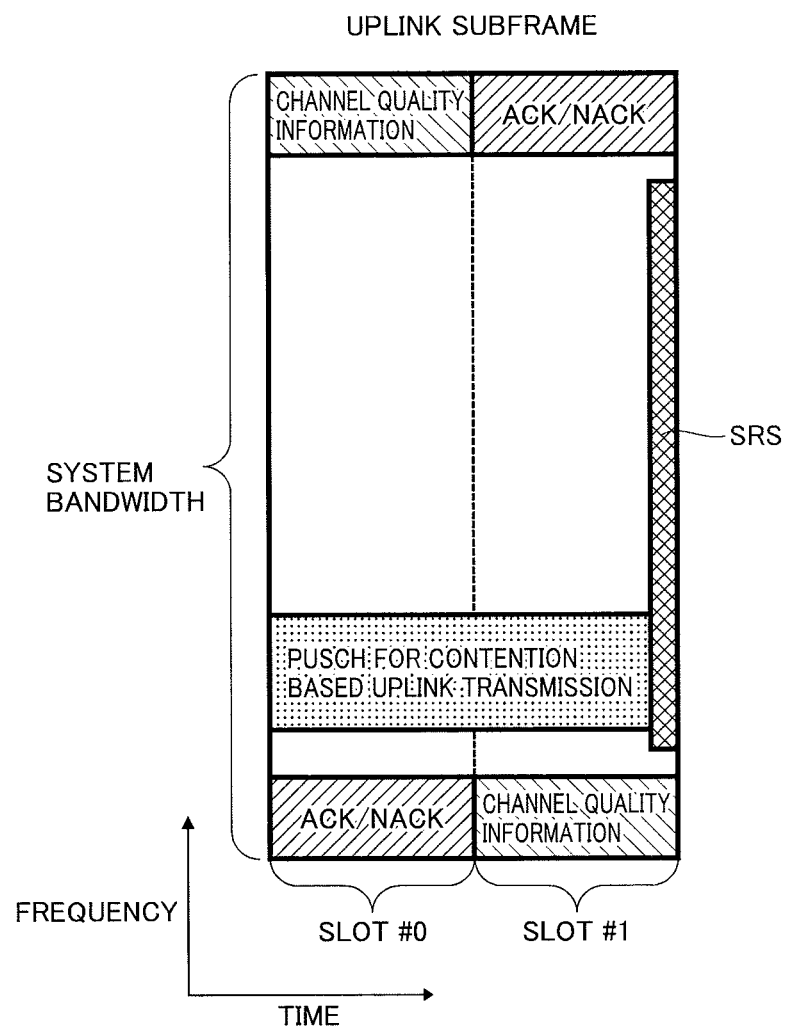
FIG. 20 is a diagram showing an example of radio resource allocation for ACK/NACK, the channel quality information, the SRS, and contention based uplink transmission according to the present invention.

Furthermore, when the contention based uplink transmission signal, ACK/NACK, the channel quality information, and the SRS collide with one another in the same uplink subframe as shown in FIG. 20, mobile station device 1 (i) may perforin contention based uplink transmission without transmitting ACK/NACK, the channel quality information and the SRS, (ii) may transmit ACK/NACK and the channel quality information without transmitting the contention based uplink transmission signal and the SRS, and (iii) may transmit the contention based uplink transmission signal, ACK/NACK and the channel quality information. In addition, when simultaneously transmitting ACK/NACK and the channel quality information, mobile station device 1 may transmit ACK/NACK and the channel quality information by separate PUCCH radio resources, or may transmit both ACK/NACK and the channel quality information by the PUCCH radio resource allocated to the channel quality information.

Although contention based uplink transmission is performed on the PUSCH in the first to third embodiments as described above, the present invention is also applicable to the case where contention based uplink transmission is performed on the PUCCH.

A program running on base station device 3 and mobile station device 1 involved in the present invention may be a program controlling a CPU (Central Processing Unit) or the like (a program causing a computer to function) so that the functions of the above-described embodiment involved in the present invention are implemented. Information handled by these devices is temporarily stored in a RAM (Random Access Memory) when processed, thereafter stored in any of a variety of ROMs such as flash ROM (Read Only Memory) or HDD (Hard Disk Drive), and read, modified and written by the CPU as required.

Mobile station device 1 and base station device 3 in the above-described embodiment may partially be implemented by a computer. In this case, a program for implementing the control function may be recorded on a computer-readable recording medium, and the program recorded on this recording medium may be read and executed by a computer system so as to implement it. "Computer system" herein refers to a computer system integrated in mobile station device 1 or base station device 3 and includes OS and hardware such as peripherals.

"Computer-readable recording medium" refers to portable media such as flexible disk, magneto-optical disk, ROM, and CD-ROM, as well as storage devices such as hard disk integrated in a computer system. Moreover, "computer-readable recording medium" may also include those dynamically holding a program for a short period of time, like communication lines used in the case where a program is transmitted through a network such as Internet or a communication line such as telephone line, and those holding the program for a certain period of time, like a volatile memory in a server or a computer system functioning as a client in the aforementioned case. The program above may also be used for implementing a part of the above-described functions, or may be the one that enables the above-described functions to be implemented in combination with a program having already been recorded in the computer system.

Mobile station device 1 and base station device 3 in the embodiment described above may partially or wholly be implemented typically in the form of an LSI which is an integrated circuit. The functional blocks of mobile station device 1 and base station device 3 may individually be configured in the form of a chip, or may partially or wholly be integrated into a chip. The integrated circuit may be implemented not only in the form of an LSI but a dedicated circuit or general-purpose processor. If the advance in semiconductor technology provides any technology for implementing an integrated circuit that replaces the LSI, an integrated circuit provided by this technology may also be used.

Namely, the functions of mobile station device 1 may be implemented by an integrated circuit or a plurality of circuits. The functions of base station device 3 may also be implemented by an integrated circuit or a plurality of circuits.

<Additional Notes>

(1) A mobile station device communicates with a base station device. The mobile station device receives downlink data and a downlink control channel indicating an uplink radio resource for contention based signal transmission; and transmits a contention based signal without transmitting acknowledgement when the contention based signal and the acknowledgement for the downlink data received from the base station device collide with each other in the same uplink time frame.

(2) A mobile station device communicates with a base station device. The mobile station device receives downlink data and a downlink control channel indicating an uplink radio resource for contention based signal transmission; and transmits acknowledgement without transmitting a contention based signal when the contention based signal and the acknowledgement for the downlink data received from the base station device collide with each other in the same uplink time frame.

(3) A mobile station device communicates with a base station device. The mobile station device receives downlink data and a downlink control channel indicating an uplink radio resource for contention based signal transmission; and transmits both of a contention based signal and acknowledgement when the contention based signal and the acknowledgement for the downlink data received from the base station device collide with each other in the same uplink time frame.

(4) A mobile station device communicates with a base station device. The mobile station device receives a downlink control channel indicating an uplink radio resource for contention based signal transmission; transmits a reference signal for uplink channel quality measurement by the radio resource allocated to the base station device; and transmits a contention based signal without transmitting the reference signal when the contention based signal and the reference signal collide with each other in the same time frame.

(5) A radio communication method is applied to a mobile station device communicating with a base station device. The radio communication method includes the steps of receiving downlink data and a downlink control channel indicating an uplink radio resource for contention based signal transmission; and transmitting a contention based signal without transmitting acknowledgement when the contention based signal and the acknowledgement for the downlink data received from the base station device collide with each other in the same uplink time frame.

(6) A radio communication method is applied to a mobile station device communicating with a base station device. The radio communication method includes the steps of receiving downlink data and a downlink control channel indicating an uplink radio resource for contention based signal transmission; and transmitting acknowledgement without transmitting a contention based signal when the contention based signal and the acknowledgement for the downlink data received from the base station device collide with each other in the same uplink time frame.

(7) A radio communication method is applied to a mobile station device communicating with a base station device. The radio communication method includes the steps of receiving downlink data and a downlink control channel indicating an uplink radio resource for contention based signal transmission; and transmitting both of a contention based signal and acknowledgement when the contention based signal and the acknowledgement for the downlink data received from the base station device collide with each other in the same uplink time frame.

(8) A radio communication method is applied to a mobile station device communicating with a base station device. The radio communication method includes the steps of receiving a downlink control channel indicating an uplink radio resource for contention based signal transmission; transmitting a reference signal for uplink channel quality measurement by the radio resource allocated to the base station device; and transmitting a contention based signal without transmitting the reference signal when the contention based signal and the reference signal collide with each other in the same time frame.

(9) An integrated circuit is applied to a mobile station device communicating with a base station device. The integrated circuit includes means for receiving downlink data and a downlink control channel indicating an uplink radio resource for contention based signal transmission; and means for transmitting a contention based signal without transmitting acknowledgement when the contention based signal and the acknowledgement for the downlink data received from the base station device collide with each other in the same uplink time frame.

(10) An integrated circuit is applied to a mobile station device communicating with a base station device. The integrated circuit includes means for receiving downlink data and a downlink control channel indicating an uplink radio resource for contention based signal transmission; and means for transmitting acknowledgement without transmitting a contention based signal when the contention based signal and the acknowledgement for the downlink data received from the base station device collide with each other in the same uplink time frame.

(11) An integrated circuit is applied to a mobile station device communicating with a base station device. The integrated circuit includes means for receiving downlink data and a downlink control channel indicating an uplink radio resource for contention based signal transmission; and means for transmitting both of a contention based signal and acknowledgement when the contention based signal and the acknowledgement for the downlink data received from the base station device collide with each other in the same uplink time frame.

(12) An integrated circuit is applied to a mobile station device communicating with a base station device. The integrated circuit includes means for receiving a downlink control channel indicating an uplink radio resource for contention based signal transmission; means for transmitting a reference signal for uplink channel quality measurement by the radio resource allocated to the base station device; and means for transmitting a contention based signal without transmitting the reference signal when the contention based signal and the reference signal collide with each other in the same time frame.

While one embodiment of the present invention has been described in detail with reference to the drawings, specific features are not limited to the above-described ones and various design changes and the like may be made within the scope without going beyond the substance of the invention.

REFERENCE SIGNS LIST

1 (1A, 1B, 1C) mobile station device; 3 base station device; 101 higher-layer processing unit; 103 control unit; 105 reception unit; 107 transmission unit; 109 channel measurement unit; 201 higher-layer processing unit; 203 control unit; 205 reception unit; 207 transmission unit; 209 channel measurement unit; 1013 scheduling unit; 1015 downlink control information generation unit; 2013 scheduling unit; 2031 transmission signal control unit.

The invention claimed is:

1. A mobile station apparatus configured to communicate with a base station apparatus, the mobile station apparatus comprising:
   a reception unit configured to receive downlink data on a physical downlink shared channel and information indicating radio resources for transmission of a physical uplink shared channel associated with contention based procedure; and
   a transmission unit configured to transmit Hybrid Automatic Repeat Request (HARQ) information in response to the downlink data and transmit uplink data on the physical uplink shared channel associated with contention based procedure, the HARQ information consisting of an acknowledgement or a negative acknowledgement for the downlink data; wherein
   in accordance with setting used in a case that the HARQ information and the uplink data collide with each other in a single subframe and made by the base station apparatus for determining whether the HARQ information and the uplink data are simultaneously transmitted or one of the HARQ information and the uplink data is transmitted,
   the transmission unit is configured to transmit, in a case that transmissions of the HARQ information and the uplink data happen in the single subframe, either both of the HARQ information and the uplink data or the uplink data without the HARQ information in the single subframe.

2. The mobile station apparatus according to claim 1, wherein
   the physical uplink shared channel associated with contention based procedure has a possibility of colliding with the physical uplink shared channel associated with contention based procedure which is transmitted by other mobile station apparatus.

3. The mobile station apparatus according to claim 2, wherein
   the HARQ information is transmitted via a physical uplink control channel.

4. A base station apparatus configured to communicate with a mobile station apparatus, the base station apparatus comprising:

a transmission unit configured to transmit downlink data on a physical downlink shared channel and information indicating radio resources for transmission of a physical uplink shared channel associated with contention based procedure; and a reception unit configured to receive Hybrid Automatic Repeat Request (HARQ) information in response to the downlink data and receive uplink data on the physical uplink shared channel associated with contention based procedure, the HARQ information consisting of an acknowledgement or a negative acknowledgement for the downlink data; wherein in accordance with setting used in a case that the HARQ information and the uplink data collide with each other in a single subframe and made by the base station apparatus for determining whether the HARQ information and the uplink data are simultaneously transmitted or one of the HARQ information and the uplink data is transmitted, the base station apparatus configures a configuration to the mobile station apparatus, the configuration being a configuration for determining whether both of the HARQ information and the uplink data, or the uplink data without the HARQ information is/are transmitted in the single subframe in a case that transmissions of the HARQ information and the uplink data happen in the single subframe.

5. The base station apparatus according to claim 4, wherein the HARQ information is transmitted via a physical uplink control channel.

6. A communication method used for a mobile station apparatus that is configured to communicate with a base station apparatus, the communication method comprising:

receiving downlink data on a physical downlink shared channel and information indicating radio resources for transmission of a physical uplink shared channel associated with contention based procedure; and transmitting Hybrid automatic Repeat Request (HARQ) information in response to the downlink data and transmitting uplink data on the physical uplink shared channel associated with contention based procedure, the HARQ information consisting of an acknowledgement or a negative acknowledgement for the downlink data, wherein in accordance with setting used in a case that the HARQ information and the uplink data collide with each other in a single subframe frame and made by the base station apparatus for determining whether the HARQ information and the uplink data are simultaneously transmitted or one of the HARQ information and the uplink data is transmitted, transmitting, in a case that transmissions of the HARQ information and the uplink data happen in the single subframe, either both of the HARQ information and the uplink data without the HARQ information in the single subframe.

7. A communication method used for a base station apparatus that is configured to communicate with a mobile station apparatus, the communication method comprising:

transmitting downlink data on a physical downlink shared channel and information indicating radio resources for transmission of a physical uplink shared channel associated with contention based procedure;

receiving Hybrid Automatic Repeat Request (HARQ) information in response to the downlink data and receive uplink data on the physical uplink shared channel associated with contention based procedure, the HARQ information consisting of an acknowledgement or a negative acknowledgement for the downlink data; wherein in accordance with setting used in a case that the HARQ information and the uplink data collide with each other in a single subframe and made by the base station apparatus for determining whether the HARQ information and the uplink data are simultaneously transmitted or one of the HARQ information and the uplink data is transmitted, configuring a configuration to the mobile station apparatus, the configuration being a configuration for determining whether both of the HARQ information and the uplink data, or the uplink data without the HARQ information is/are transmitted in the single subframe in a case that transmissions of the HARQ information and the uplink data happen in the single subframe.

* * * * *